(12) United States Patent
Kang et al.

(10) Patent No.: US 10,506,153 B2
(45) Date of Patent: Dec. 10, 2019

(54) DEVICE AND METHOD FOR PROCESSING IMAGE IN ELECTRONIC DEVICE

(71) Applicant: Samsung Electronics Co., Ltd, Gyeonggi-do (KR)

(72) Inventors: Donggoo Kang, Seoul (KR); YunKyung Kim, Gyeonggi-do (KR); Jinah Kong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 15/283,266

(22) Filed: Sep. 30, 2016

(65) Prior Publication Data

US 2017/0094168 A1 Mar. 30, 2017

(30) Foreign Application Priority Data

Sep. 30, 2015 (KR) .................. 10-2015-0137653

(51) Int. Cl.
| | | |
|---|---|---|
| *H04N 5/232* | (2006.01) | |
| *G06F 1/16* | (2006.01) | |
| *H04N 5/225* | (2006.01) | |
| *H04M 1/02* | (2006.01) | |
| *G06T 11/00* | (2006.01) | |
| *G06T 11/60* | (2006.01) | |
| *H04N 5/247* | (2006.01) | |

(52) U.S. Cl.
CPC ....... *H04N 5/23238* (2013.01); *G06F 1/1652* (2013.01); *G06F 1/1677* (2013.01); *G06F 1/1681* (2013.01); *G06T 11/00* (2013.01); *H04M 1/0241* (2013.01); *H04M 1/0264* (2013.01); *H04M 1/0268* (2013.01); *H04N 5/2252* (2013.01); *H04N 5/2258* (2013.01); *H04N 5/23245* (2013.01); *H04N 5/23293* (2013.01); *G06T 11/60* (2013.01); *G06T 2207/20221* (2013.01); *H04M 2250/52* (2013.01); *H04N 5/247* (2013.01)

(58) Field of Classification Search
CPC .................................. H04N 5/23238
See application file for complete search history.

(56) References Cited

U.S. PATENT DOCUMENTS

| | | | |
|---|---|---|---|
| 9,013,458 B2 | 4/2015 | Cho et al. | |
| 2010/0182265 A1* | 7/2010 | Kim | G06F 1/1616 |
| | | | 345/173 |
| 2010/0302347 A1* | 12/2010 | Shikata | H04N 5/232 |
| | | | 348/36 |
| 2012/0105579 A1* | 5/2012 | Jeon | H04N 5/2258 |
| | | | 348/38 |
| 2012/0294549 A1* | 11/2012 | Doepke | G06T 3/4038 |
| | | | 382/294 |

(Continued)

FOREIGN PATENT DOCUMENTS

KR 10-2012-0045850 5/2012

*Primary Examiner* — Rowina J Cattungal

(57) ABSTRACT

A device and method for photographing a panoramic image in a foldable electronic device. According to various embodiments of the present disclosure, the electronic device may set a photographing mode and determine the folding of a housing in the photographing mode. The electronic device may acquire images from an image sensor, the photographing position of which varies according to the folding and generate a panoramic image by composing the acquired images.

10 Claims, 25 Drawing Sheets

(56) References Cited

U.S. PATENT DOCUMENTS

| | | | |
|---|---|---|---|
| 2013/0044240 A1* | 2/2013 | Leskela | H04N 5/2253 348/239 |
| 2014/0285476 A1* | 9/2014 | Cho | G06F 1/1601 345/204 |
| 2015/0009129 A1* | 1/2015 | Song | G06F 1/1652 345/156 |
| 2015/0029304 A1 | 1/2015 | Park | |
| 2015/0244940 A1* | 8/2015 | Lombardi | H04N 5/23293 348/333.06 |

* cited by examiner

DEVICE AND METHOD FOR PROCESSING IMAGE IN ELECTRONIC DEVICE

CROSS-REFERENCE TO RELATED APPLICATION(S) AND CLAIM OF PRIORITY

The present application is related to and claims the priority under 35 U.S.C. § 119(a) to Korean Application Serial No. 10-2015-0137653, which was filed in the Korean Intellectual Property Office on Sep. 30, 2015, the entire content of which is hereby incorporated by reference.

TECHNICAL FIELD

Various embodiments of the present disclosure relate to an electronic device processing an image in a foldable electronic device and an operating method thereof.

BACKGROUND

In recent years, with the development of digital technologies, various types of electronic devices have been widely used, such as a mobile communication terminal, a smart phone, a tablet Personal Computer (PC), a Personal Digital Assistant (PDA), an electronic organizer, a notebook computer, a wearable device, a camera, etc. Electronic devices have reached the level of mobile convergence at which they include the functions of other devices. For example, electronic devices may provide a call function (such as a voice call, a video call, etc.), an image photographing and processing function, a message transmitting/receiving function (such as a Short Message Service (SMS)/Multimedia Message Service (MMS), an e-mail, etc.), an electronic organizer function, a broadcasting program reproduction function, a video reproduction function, a music reproduction function, an Internet function, a messenger function, a game function, a Social Network Service (SNS) function, and the like.

SUMMARY

Displays have been developed to be curved or folded, and curved displays have been increasingly employed for electronic devices.

To address the above-discussed deficiencies, it is a primary object to provide an electronic device having a flexible display and a folding structure.

Various embodiments of the present disclosure provide a device and method that enable a user to photograph a panoramic image in one place without a movement using a folding structure of an electronic device.

Various embodiments of the present disclosure provide a device and method that enable an electronic device with a folding structure to process a continuous movement of a moving object into one piece of content in real time without a separate editing function.

Various embodiments of the present disclosure provide a device and method that enable an electronic device with a folding structure to intuitively select a desired image among consecutively photographed images and to process various forms of panoramic images in real time.

An electronic device, according to various embodiments of the present disclosure, includes: a foldable housing; a flexible display functionally connected with the foldable housing; a sensor that detects folding; a camera that acquires at least one panoramic image according to the degree of the folding when the folding is detected; and a processor that processes the panoramic image, which is acquired by the camera, according to a set photographing mode.

An electronic device, according to various embodiments of the present disclosure, includes a foldable housing and a flexible display functionally connected with the foldable housing, and performs an operation of detecting folding, an operation of acquiring at least one panoramic image according to the degree of the folding when the folding is detected, and an operation of processing the acquired panoramic image according to a set photographing mode.

An electronic device, according to various embodiments of the present disclosure, includes: a foldable housing; a flexible display functionally connected with the foldable housing; a sensor that detects folding; a camera that acquires images according to the degree of the folding when the folding is detected; and a processor that determines a photographing mode and processes the images, which are acquired by the camera, according to the photographing mode.

An electronic device, according to various embodiments of the present disclosure, includes a foldable housing and a flexible display functionally connected with the foldable housing, and performs an operation of detecting folding, an operation of acquiring at least one panoramic image according to the degree of the folding when the folding is detected, an operation of determining a photographing mode for the acquired panoramic image, and an operation of processing the panoramic image according to the determined photographing mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates the rear side of the flexible device in an unfolded state;

DETAILED DESCRIPTION

Figure 1:
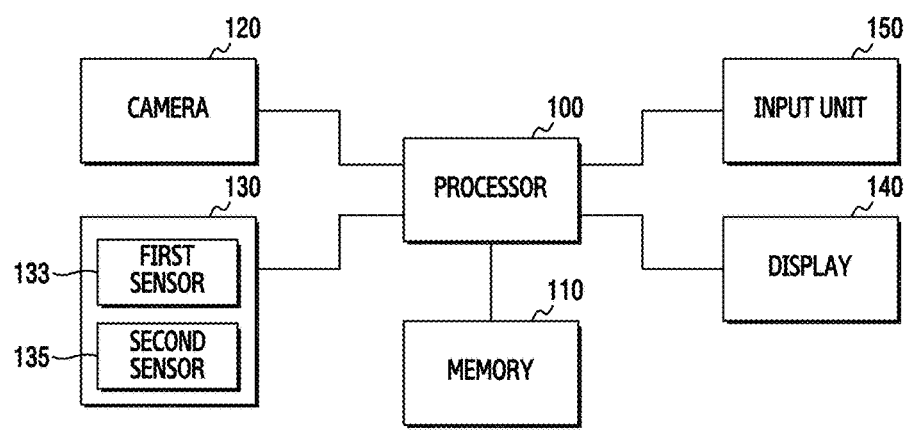
FIG. 1 illustrates a block diagram of an electronic device having a folding structure in various embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiment of the present disclosure will be described in connection with the accompanying drawings. However, it should be understood that the present disclosure is not limited to the particular embodiment, but includes all modifications, equivalents, and/or alternatives within the spirit and scope of the present disclosure. In the description of the drawings, similar reference numerals may be used to designate similar elements.

The terms as used in various embodiments of the present disclosure are used merely to describe a certain embodiment and are not intended to limit the present disclosure. As used herein, singular forms may include plural forms as well unless the context explicitly indicates otherwise. All terms used herein, including technical and scientific terms, have the same meaning as commonly understood by those of skill in the art which the present disclosure pertains. Such terms as those defined in a generally used dictionary are to be interpreted to have the meaning equal to the contextual meanings in the relevant field of art, and are not to be interpreted to have ideal or excessively formal meanings unless clearly defined in various embodiments of the present disclosure In some cases, even the term defined in the present disclosure should not be interpreted to exclude embodiments of the present disclosure An electronic device according to various embodiments of the present disclosure may be a device including a communication function. For example, the electronic device may include at least one of a smartphone, a tablet personal computer, a mobile phone, a video phone, an electronic book (e-book) reader, a desktop PC, a laptop PC, a netbook computer, a workstation, a server, a personal digital assistant, a portable multimedia player, a mp3 player, a mobile medical appliance, a camera, a wearable device, Hereinafter, various embodiments of the present disclosure will be described based on an approach of hardware. However, various embodiments of the present disclosure include a technology that uses both hardware and software and thus, the various embodiments of the present disclosure may not exclude the perspective of software.

FIG. 1 illustrates a block diagram of an electronic device having a folding structure in various embodiments of the present disclosure.

Referring to FIG. 1, a processor 100 may include one or more of a Central Processing Unit (CPU), an Application Processor (AP), and a Communication Processor (CP). The processor 100 may carry out, for example, operations or data processing relating to the control, image processing, and/or communication of at least one other element of the electronic device.

A memory 110 may include a volatile and/or non-volatile memory. The memory 110 may store, for example, commands or data relating to at least one other element of the electronic device. According to an embodiment, the memory 110 may store software and/or programs. The programs may include, for example, a kernel, middleware, an Application Programming Interface (API), and/or application programs (or "applications"). At least some of the kernel, the middleware, and the API may be referred to as an Operating System (OS).

A camera 120 may include an image sensor. The camera 120 may convert a received external optical signal into an electrical signal and may convert the electrical signal into digital data to output image data in a set photographing mode.

The sensor module 130 may, for example, measure a physical quantity or detect information on the operating state of the electronic device, and may convert the measured or detected information into an electrical signal. The sensor module 130 may include a first sensor 133 that is capable of recognizing the folding angle of the electronic device and a second sensor 135 that is capable of recognizing the rotation angle (or direction) of the electronic device. The first sensor 133 may be, for example, a flexible strap sensor, and may be installed in the position where the electronic device is folded. The first sensor 133 may measure the absolute value of the folding angle of the electronic device. The second sensor 135 may include, for example, at least one of a gesture sensor, a gyro sensor, an acceleration sensor, and a grip sensor. The second sensor 135 may be used as an auxiliary means for the first sensor 133 to measure the folding angle of the electronic device. For example, the second sensor 135 may measure the relative value of the folding angle. Furthermore, the second sensor 135 may measure a change in the direction of the electronic device and the rotation angle of the electronic device that photographs an image.

The sensor module 130 may further include a control circuit for controlling one or more sensors included therein. In some embodiments, the electronic device may further include a processor configured to control the sensor module 130 as a part of, or separately from, the processor 100.

A display 140 may include, for example, a Liquid Crystal Display (LCD), a Light-Emitting Diode (LED) display, an Organic Light-Emitting Diode (OLED) display, a MicroElectroMechanical System (MEMS) display, or an electronic paper display. The display 140 may display, for example, various types of content (e.g., text, images, videos, icons, symbols, etc.) for a user. The display 140, according to various embodiments of the present disclosure, may be a flexible display.

An input unit 150 may serve as, for example, an interface that forwards commands or data input from a user or an external device to the other element(s) of the electronic device. The input unit 150 may be a touch panel.

The display 140 and the input unit 150, according to various embodiments of the present disclosure, may be configured to be an integrated touch screen. The touch screen may receive, for example, a touch, gesture, proximity, or hovering input using an electronic pen or a part of a user's body.

Although not illustrated in FIG. 1, the electronic device may further include a communication interface. The communication interface may configure, for example, communication between the electronic device and an external device (e.g., an external electronic device or a server). For example, the communication interface may be connected to a network through wireless communication (e.g., LTE, BLUETOOTH®, NFC, etc.) or wired communication (e.g., a USB cable) to communicate with the external device.

Figure 2A:
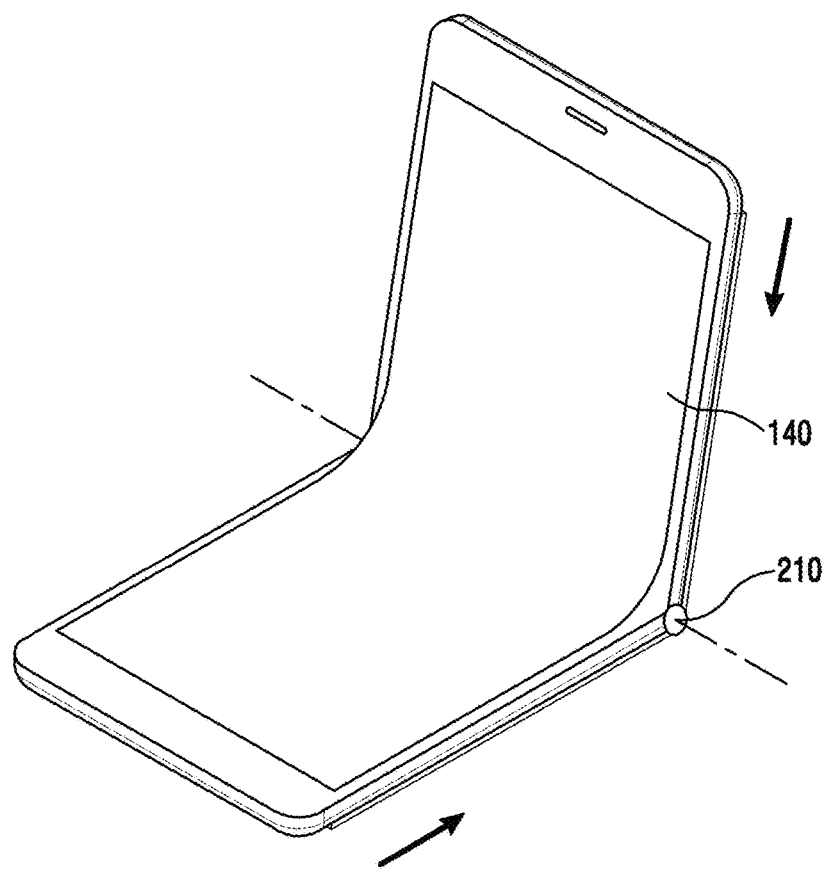
FIGS. 2A to 2C illustrate the external configuration of a foldable electronic device according to various embodiments of the present disclosure.
Figure 2B:
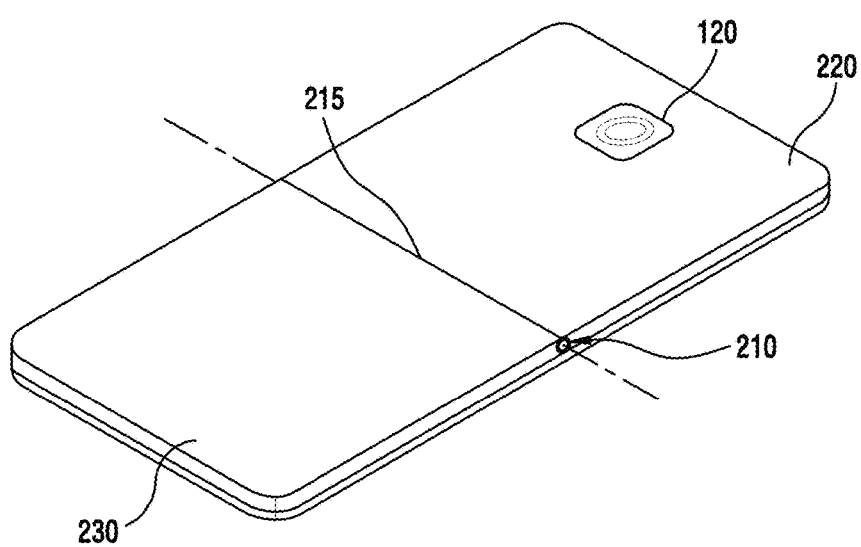
Figure 2C:
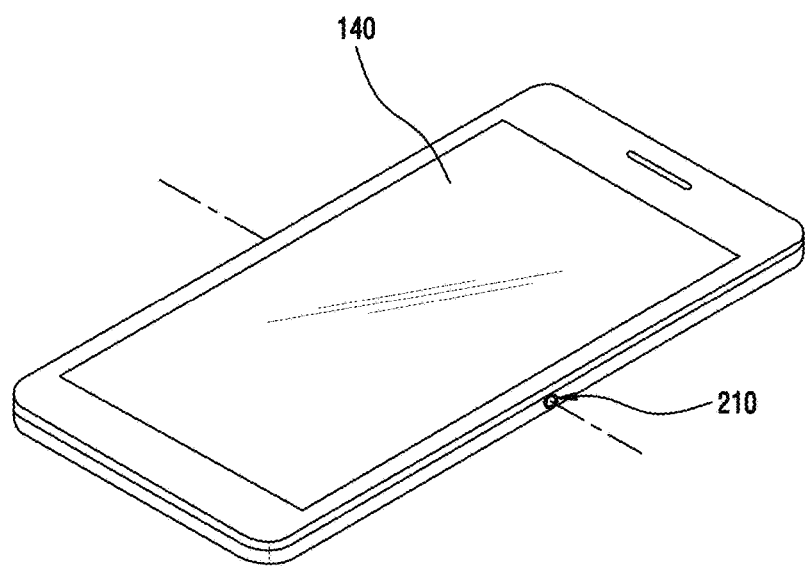

FIGS. 2A to 2C illustrate the external configuration of a foldable electronic device according to various embodiments of the present disclosure.

FIG. 2A illustrates a perspective view of the flexible device according to various embodiments of the present disclosure, where FIG. 2A illustrates a state in which the flexible device is folded to about 90 degrees. FIG. 2B illustrates a perspective view of the flexible device according to various embodiments of the present disclosure, where FIG. 2B illustrates the rear side of the flexible device in an unfolded state. FIG. 2C illustrates a perspective view of the flexible device according to various embodiments of the present disclosure, where FIG. 2B illustrates the front side of the flexible device in an unfolded state.

Referring to FIGS. 2A to 2C, the flexible device may have a structure in which the housing is divided into a first housing 220 and a second housing 230 with respect to a folding device. Furthermore, the flexible device may be a single housing that has parts connected to each other, and the parts may be differently referred to as the first housing 220 and the second housing 230. Herein, the folding device may be a hinge 210. The electronic device may refer to a device that may be curved, bent, or folded through the hinge 210. Accordingly, the hinge 210 and the folding axis 215 may exist in the electronic device.

The electronic device, according to various embodiments of the present disclosure, may have a display 140 fixedly disposed on the front side surface thereof as illustrated in FIG. 2C. The display 140 may be configured with a flexible touch screen. The display 140 may be formed of a flexible material so that the display 140 may be flat, or may be rolled, curved, or bent. The display 140 may be folded about the folding axis 215 through the hinge 210 in the same direction in which the electronic device is curved.

The electronic device, according to various embodiments of the present disclosure, may have a camera 120 fixedly disposed on the rear side surface thereof as illustrated in FIG. 2B. The camera 120 may be disposed in the first or second housing 220 or 230. The camera 120 may be disposed on a longitudinal end of the housing such that the distance by which the camera 120 moves when the electronic device is folded becomes larger.

Figure 3:
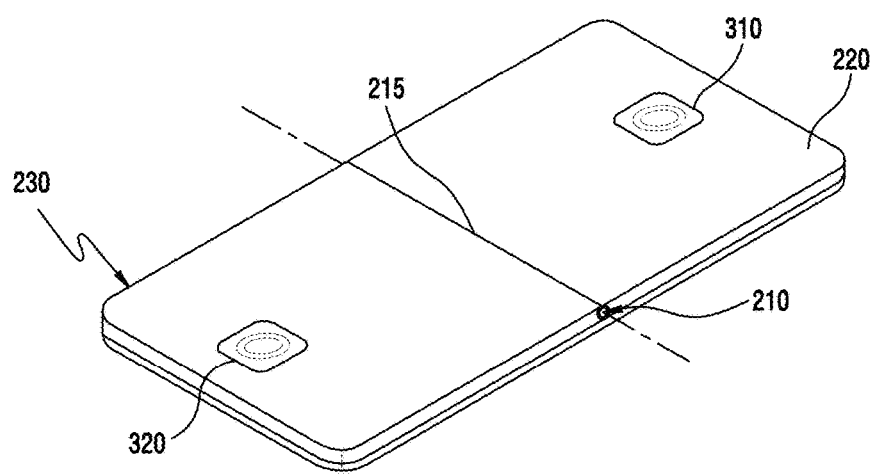
FIG. 3 illustrates a perspective view of a flexible device according to various embodiments of the present disclosure, where

FIG. 3 illustrates a perspective view of a flexible device according to various embodiments of the present disclosure, where FIG. 3 illustrates the rear side of the flexible device in an unfolded state.

Referring to FIG. 3, a camera may be mounted on the rear side surface of the electronic device. For example, two or more cameras may be installed on the rear side surface of the electronic device. For example, as illustrated in FIG. 3, a first camera 310 may be mounted on a longitudinal end of the first housing (e.g., the upper end of the electronic device), and a second camera 320 may be mounted on a longitudinal end of the second housing 230 (e.g., the lower end of the electronic device). For example, the first and second cameras 310 and 320 may be spaced apart from each other by a distance of 60 mm or more. When the two cameras 310 and 320 are mounted on the opposite ends of the electronic device, as illustrated in FIG. 3, an image with a wider range may be acquired by folding the electronic device.

Figure 4A:
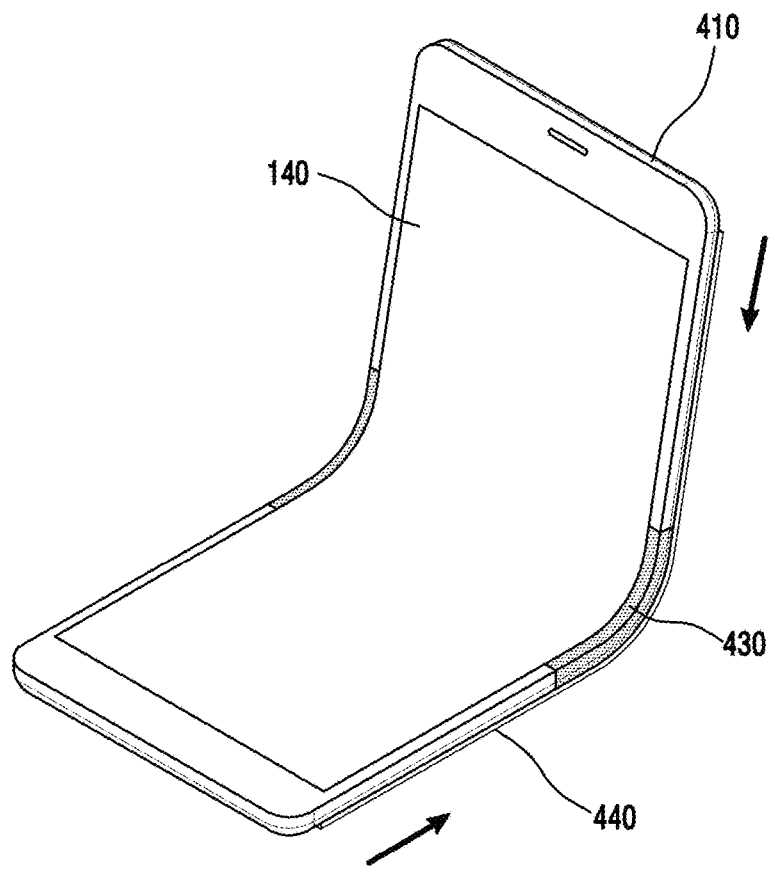
FIGS. 4A to 4E illustrate various external configurations of a foldable electronic device according to various embodiments of the present disclosure.
Figure 4B:
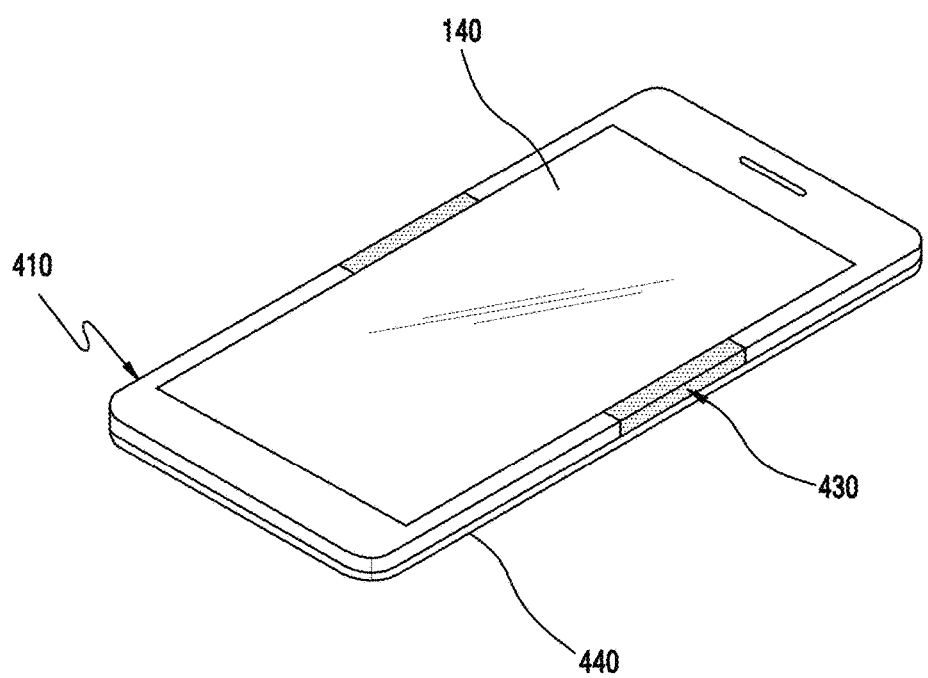
Figure 4C:
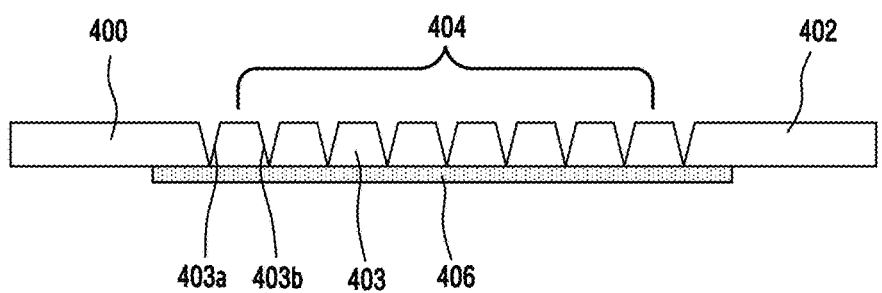
Figure 4D:
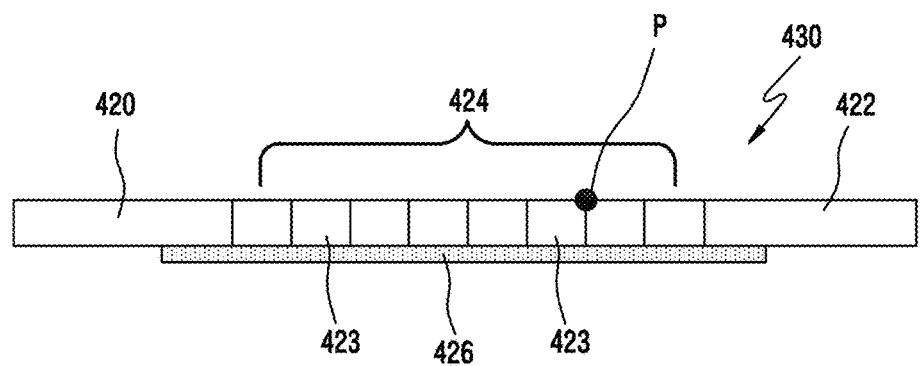
Figure 4E:
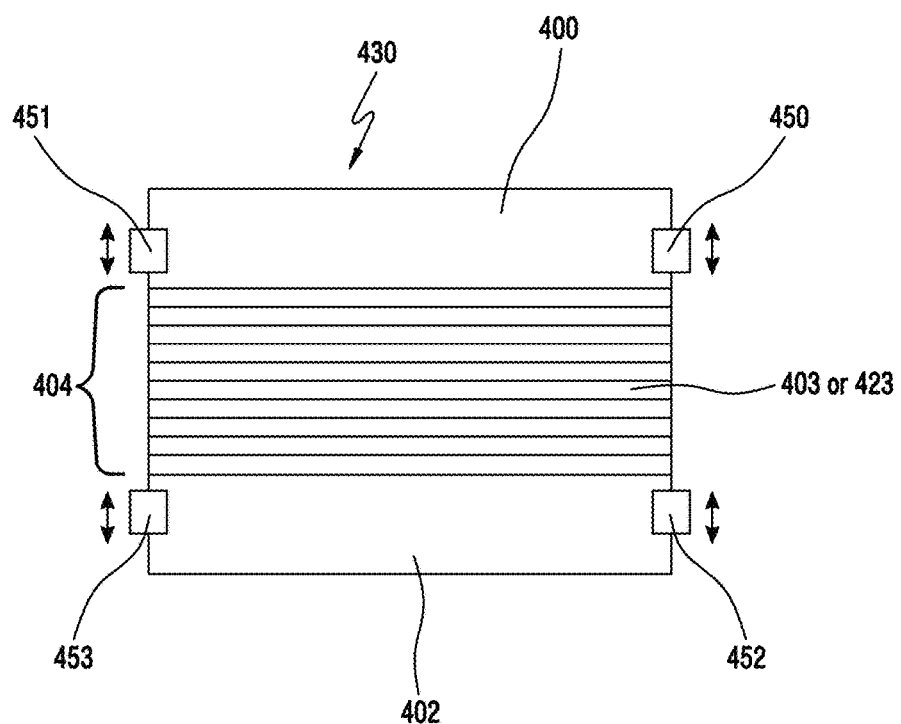

FIGS. 4A to 4E illustrate various external configurations of a foldable electronic device according to various embodiments of the present disclosure. FIG. 4A illustrates a perspective view of the flexible device according to various embodiments of the present disclosure, where FIG. 4A illustrates a state in which the flexible device is folded to about 90 degrees. FIG. 4B illustrates a perspective view of the flexible device according to various embodiments of the present disclosure, where FIG. 4B illustrates the flexible device in an unfolded state. FIG. 4C illustrates a sectional view of a folding device according to various embodiments of the present disclosure, where FIG. 4C illustrates the folding device in an unfolded state. FIG. 4D illustrates a sectional view of the folding device according to various embodiments of the present disclosure, where FIG. 4D illustrates the folding device in an unfolded state. FIG. 4E illustrates a view of the arrangement state of a holding device disposed on the folding device according to various embodiments of the present disclosure.

Referring to FIGS. 4A to 4E, the electronic device refers to a device in which the main body 410 may be curved, bent, or folded. Accordingly, the folding device 430 and the folding axis may exist in the electronic device. In addition, the display 140 provided on the main body 410 may be a flexible display, and may refer to a display that may be curved, bent, or folded together with the main body 410. The electronic device, according to various embodiments of the present disclosure, may have the display disposed on the front side surface of the main body 410, as illustrated in FIG. 4B. Further, a camera 120 may be disposed on the rear side surface of the main body 410.

The electronic device may include the main body 410, the display 140, and a cover 440. The main body 410 may be configured to be folded by the folding device 430. The portion of the main body 410 that is not folded and the portion of the main body 410 that is folded may be formed of different materials. The portion of the main body 410 that is folded may be formed of a flexible material, and the portion of the main body 410 that is not folded may be formed of a rigid material. In addition, the display 140 may be formed of a flexible material so that the display 140 may be flat, or may be rolled, curved, or bent.

The main body 410 includes the non-illustrated main board and electronic components mounted on the main board. The non-illustrated main board may be configured to be a joint structure by a flexible circuit part (PCB). The flexible circuit part may be disposed in the folding device 430. The display 140 may be fixedly disposed on one surface of the main body 410, and the cover 440 may be movably disposed on an opposite surface of the main body 410. The camera 120 may be disposed in one area of the cover 440.

If the main body 410 is curved, bent, or folded, a difference in the percentage of elongation may occur in the folded portion. In other words, the inside of the folded portion of the main body 410 is subjected to compression, whereas the outside of the folded portion is subjected to tension. It has nothing to do with the display 140 provided on the main body since the display 140 is a thin flexible display. However, the main body 410 undergoes a relatively large difference in the percentage of elongation, compared with the display 140. The folding device 430 may solve the problem of the main body 410, and the cover 440 may solve the problem caused by the difference in the percentage of elongation since the cover 440 is slidably mounted on the opposite surface of the main body 410.

The cover 440 may be mounted to slide in the longitudinal direction of the main body 410 while facing the opposite surface of the main body 410. As the main body 410 is curved, bent, or folded, the cover 440 may slide while facing the main body 410. Namely, a sliding device may be installed between the main body 410 and the cover 440. The sliding distance of the cover 440 may increase with an increase in the degree to which the main body 410 is curved, bent, or folded. In the unfolded state illustrated in FIG. 4B, the cover 440 may completely close the opposite surface of the main body 410 without a movement, and in the folded state illustrated in FIG. 4A, the cover 440 may slide to open a part of the opposite surface of the main body 410 to the maximum. The cover 440 may also have a foldable portion that faces the folding device 430. To this end, the cover 440 may be formed of a flexible material, such as leather.

The folding device 430, according to various embodiments of the present disclosure, may include a foldable member on the portion of the main body 410 that is folded, as illustrated in FIG. 4C. The foldable member may be provided in the position where the main body 410 and the display 140 are folded, and may be movably provided inside the portion of the main body 410 that is folded. That is, the foldable member may be mounted in the main body 410 so as to be hidden from the outside. In other words, while the electronic device is completely unfolded, the foldable member may move so as to not protrude from the portion of the main body 410 that is folded. This may make the exterior design of the electronic device simple and appealing since the main body 410 may be configured with a thickness that does not include the thickness of the foldable member.

The foldable member may be received in the internal space of the main body 410 and may be movably mounted while being disposed in the main body 410. Namely, while the main body 410 is being curved, bent, or folded, the foldable member may slide along the direction in which the mounting space is formed.

The foldable member may substantially have a flat shape as illustrated in FIG. 4C. The foldable member may be received in the space of the main body 410 and may move while the main body 410 and the display 140 are being curved, bent, or folded. The foldable member may include first portions 400 and 402 that function as sliding guides and a second portion 404 that is folded. The first portions 400 and 402 may be constituted by opposite ends of the foldable member, and the second portion 404 may be constituted by the portion between the opposite ends of the foldable member. Further, the foldable member may extend along the folding axis, and the first portions 400 and 402 may reciprocally slide in the direction perpendicular to the folding axis.

The first portions 400 and 402 may function to guide the foldable member and to maintain the folding angle of the foldable member (together with a holding member to be described below), and the second portion 404 may be folded. The first portions 400 and 402 and the second portion 404 may all be formed of a rigid material, but may be integrally formed with a flexible material part 406 through double injection molding.

The second portion 404, which is a portion to be folded, includes a plurality of protrusions 403, 403*a*, and 403*b* disposed on the flexible material part 406. The protrusions 403, 403*a*, and 403*b* may have one of a gear shape, a saw tooth shape, and an isosceles trapezoid shape and may be arranged with an equal interval therebetween. The protrusions may all be formed in the same shape, or may be formed in different shapes.

While the flexible device is disposed to be flat, the protrusions 403, 403*a*, and 403*b* are maintained to be spaced apart from each other. In contrast, while the flexible device is folded, the protrusions 403, 403*a*, and 403*b* may closely face each other, may be brought close to each other, or may relatively closely face each other. In other words, the protrusions 403, 403*a*, and 403*b* may be further spaced apart from each other as the flexible device is in a flatter state and may be disposed more adjacent to each other as the flexible device is further folded. Finally, the protrusions 403, 403*a*, and 403*b* may make close contact with each other. The state in which the protrusions make close contact with each other may refer to a state in which the electronic device cannot be additionally bent or folded.

FIG. 4D illustrates protrusions 403, 403*a*, and 403*b* that have a gear shape.

The foldable member of FIG. 4D may be received in the space of the main body 410 and may move while the main body 410 and the display 140 are being curved, bent, or folded. The foldable member of FIG. 4D may include first portions 420 and 422 that function as sliding guides and a second portion 424 that is folded. The first portions 420 and 422 may be constituted by opposite ends of the foldable member, and the second portion 424 may be constituted by the portion between the opposite ends of the foldable member. Further, the foldable member may extend along the folding axis, and the first portions 420 and 422 may reciprocally slide in the direction perpendicular to the folding axis.

The first portions 420 and 422 may function to guide the foldable member and to maintain the folding angle of the foldable member (together with a holding member to be described below), and the second portion 424 may be folded. The first portions 420 and 440 and the second portion 424 may all be formed of a rigid material, but may be integrally formed with a flexible material part 426 through double injection molding.

However, as illustrated in FIG. 4D, the foldable member may include protrusions 423 that have a rectangular or square cross-section. The plurality of protrusions 423 illustrated in FIG. 4D may be disposed on a flexible material part 426 so as to be brought close to each other. Of course, the protrusions 423 may be disposed with an equal interval therebetween. In order to prevent interference with the display 140 located on the protrusions 423, the protrusions 423 may have a rectangular or square cross-section and may be disposed to be brought close to each other. Reference numeral P may refer to a rotation point. The corners on opposite ends of the upper surface of each protrusion 423 may be rotation points.

As illustrated in FIG. 4E, the folding device 430, according to various embodiments of the present disclosure, may be curved or folded while operating in conjunction with holding members 450 to 453. The holding members 450 to 453 may maintain the curved or folded state of the main body 410 by means of friction with the foldable member.

The plurality of holding members 450 to 453 may be disposed to operate in conjunction with the first portions 400 and 402 (i.e., the opposite ends) of the folding device 430. The holding members 450 to 453 may be disposed on the opposite ends of first portions 400 and 402 of the foldable member with respect to the folding axis to have bilateral and vertical symmetry. Each of the holding members 450 to 453 may be disposed to surround a part of the folding device 430 and may provide a force for maintaining a curved, bent, or folded state of the main body using a frictional force therebetween.

Figure 5:
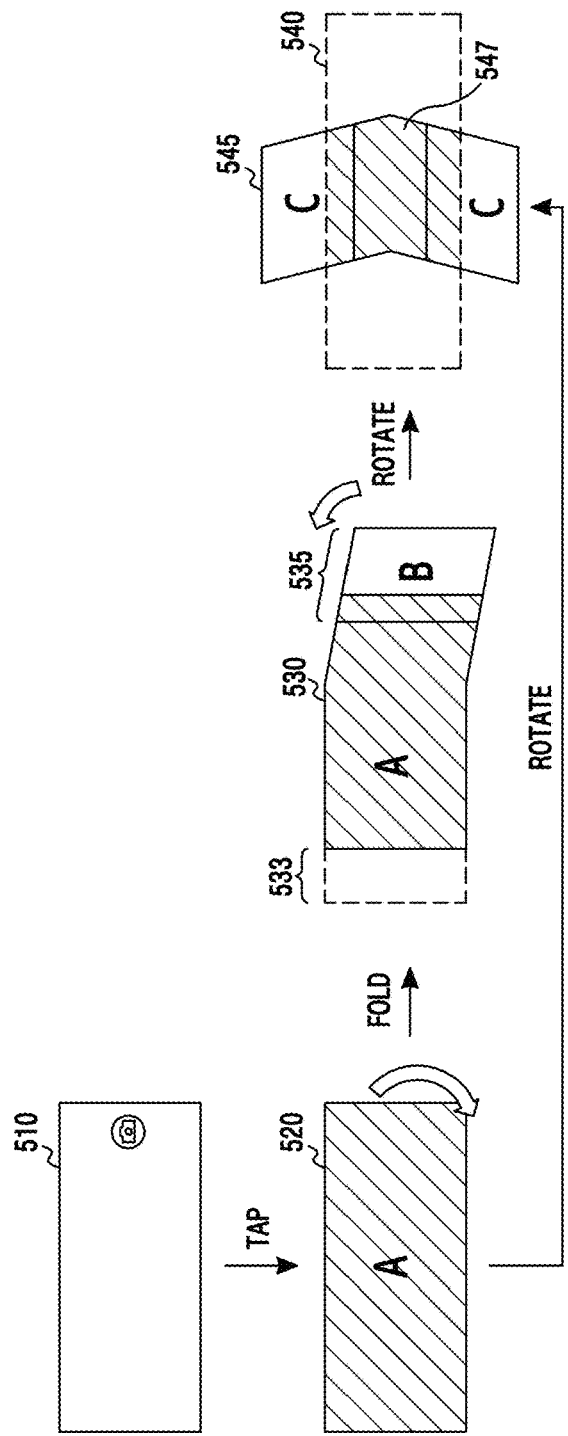
FIG. 5 illustrates an operation of acquiring and processing an image in a foldable electronic device.

FIG. 5 illustrates a view for explaining an operation of acquiring and processing an image in a foldable electronic device.

Referring to FIG. 5, the first sensor 133 may be installed adjacent to the hinge 210 or the folding device 430. In the following description, the hinge 210 exemplifies the folding device of the foldable electronic device. The processor 100 may analyze the output of the first sensor 133 to recognize whether the electronic device is folded and to analyze the folding angle of the electronic device. The first sensor 133 may be a flexible strap sensor. Accordingly, the first sensor 133 and the display 140 may be folded together in the direction in which the electronic device is folded. The second sensor 135 may detect the rotation of the electronic device. The processor 100 may analyze the output of the second sensor 135 to recognize the rotation direction and the rotation angle of the electronic device.

When a user selects a photographing mode in the state indicated by reference numeral 510 (for example, when the user taps on a capture button), the processor 100 may recognize the user's motion through the input unit 150 and may perform the photographing mode as indicated by reference numeral 520. In the photographing mode, the camera 120 may acquire an image, and the acquired image may be processed by the processor 100 and may be displayed on the display 140. The photographing mode indicated by reference numeral 520 may be a general photographing mode. When the user folds the electronic device in the photographing mode, the processor 100 may recognize the folding of the electronic device by means of the first sensor 133 and may then perform a panorama photographing mode as indicated by reference numeral 530. The panorama photographing mode, according to various embodiments of the present disclosure, may be performed by folding the electronic device, and it can be seen that the photographing position of the camera 120 is also changed when the electronic device is folded. For example, when the electronic device is folded as indicated by reference numeral 530, the photographing position of the camera 120 may also be changed, and an image of a newly photographed area (area B) may be added accordingly as indicated by reference numeral 535. The processor 100 may create a panoramic image by processing and composing the image that is not displayed on the display 140 as indicated by reference numeral 533 and the image that is additionally acquired as indicated by reference numeral 535.

After the electronic device consecutively acquires images in a first direction (e.g., in the horizontal or vertical direction) and processes the images into a first panoramic image as described above, the electronic device may be rotated and may consecutively acquire images in another direction and process the images into a second panoramic image. Thereafter, the electronic device may process the images into a surround panoramic image. When the electronic device is rotated, the processor 100 may recognize the rotation direction and the rotation angle of the electronic device by means of the output of the second sensor 135. When the electronic device is rotated as indicated by reference numeral 540 after creating the first panoramic image in the first direction, the processor 100 may recognize the rotation direction and the rotation angle of the electronic device by means of the output of the second sensor 135.

Thereafter, when the user starts to fold the electronic device in the rotated direction (e.g., in a second direction), the processor 100 may recognize the folding of the electronic device by means of the first sensor 133. After recognizing the folding of the electronic device, the processor 100 may perform a panorama photographing mode in the rotated direction and may create a second panoramic image as indicated by reference numeral 545. When the panoramic image is completely photographed, the processor 100 may create a third panoramic image by composing the first panoramic image indicated by reference numeral 540 and the panoramic image indicated by reference numeral 545. In this case, the processor 100 may compose the panoramic images in consideration of the rotation angle of the first panoramic image (e.g., 0 degrees in the horizontal direction) and the rotation angle of the second panoramic image (e.g., 90 degrees in the vertical direction). If the first and second panoramic images include the same image 547, the processor 100 may compose the first and second panoramic images such that the first and second panoramic images overlap each other in the area that includes the same image 547.

Furthermore, when the electronic device is detected to rotate from the first direction to the second direction, the processor 100 may create a panoramic image by composing images acquired by the camera 120 that is rotated in the second direction as indicated by reference numeral 545.

In various embodiments of the present disclosure, the processor 100 may set a panorama photographing mode and may control the camera 120 to acquire images when it is recognized that the electronic device is folded in the photographing mode, and the processor 100 may process the acquired images into a panoramic image and may display the panoramic image when the photographing ends. When an operation of unfolding the electronic device is recognized, the processor 100 may recognize it as the ending of the photographing. Namely, the processor 100 may perform the panorama photographing mode when the folding of the electronic device is recognized in the photographing mode through an analysis of the output of the first sensor 133, and may end the panorama photographing mode when the electronic device is detected to be unfolded in the photographing mode.

In various embodiments of the present disclosure, a panoramic image may be created by the folding of an electronic device, and complex panoramic images may be created according to the rotation direction of the electronic device. Furthermore, in various embodiments of the present disclosure, a panoramic image may be processed into a still panoramic image or a moving panoramic image according to whether a subject included in the image moves or not. In various embodiments of the present disclosure, a panorama photographing mode may be defined as follows. A still panorama photographing mode may refer to a mode for creating a panoramic image of stationary subjects in which there is no moving subject. A moving panorama photographing mode may refer to a mode for creating a panoramic image by recognizing a moving subject in the panorama photographing mode, acquiring images according to folding at specified intervals, and composing the acquired images. A consecutive panorama photographing mode may refer to a mode for creating a panoramic image by consecutively acquiring still images in the photographing mode, displaying the consecutive images after the completion of the photographing operation, and editing the displayed images. A complex panorama photographing mode may refer to a mode for creating a panoramic image by creating a first panoramic image by acquiring images according to folding at a first rotation angle, creating a second panoramic image by acquiring images according to folding at a second rotation angle, and then composing the first and second panoramic images at the corresponding rotation angle. Here, the first panoramic image may be a panoramic image that is the basis of the rotation direction (e.g., a panoramic image photographed in the horizontal direction), and the second panoramic image may be a panoramic image that is created in the rotated direction. The second panoramic image may be created using a plurality of panoramic images that correspond to rotation angles, respectively.

An electronic device, according to various embodiments of the present disclosure, may include: a connecting part located in a housing that includes a first housing and a second housing and configured to fold the housing; a flexible display corresponding to the folding of the housing; at least one camera located in the housing; a sensor configured to recognize the folding by means of the connecting part; and a processor functionally connected to the display, the camera, and the sensor. The processor may process images acquired by the camera in response to folding into a panoramic image by composing the acquired images when the folding is recognized in a photographing mode.

The processor may process the acquired images according to the folding into a general panoramic image by composing the acquired images when the photographing mode is a general panorama photographing mode.

The processor may: recognize moving subjects in the acquired images when a moving panorama photographing mode is set; acquire the images according to the folding at set intervals; and process the acquired images into a moving panoramic image by composing the acquired images such that the moving subjects do not overlap each other in the acquired images. Here, the set intervals may be specified time intervals or specified folding angles.

The processor may: recognize the rotation angle of the electronic device and process images acquired according to the folding into a first panoramic image corresponding to the recognized rotation angle when a complex panorama photographing mode is set; end the processing of the first panoramic image when unfolding is recognized; recognize a rotation angle when rotation is recognized and process images acquired according to the folding into a second panoramic image corresponding to the recognized rotation angle; and process the first and second panoramic images into a third panoramic image by composing the first and second panoramic images such that the first and second panoramic images correspond to the recognized rotation angles when the ending of the panoramic photographing is recognized.

The sensor may include: a first sensor configured to recognize a folding angle according to the connecting part; and a second sensor configured to detect the rotation direction of the electronic device, and the processor may recognize a folding angle and unfolding by means of a first sensor and may recognize a rotation angle by means of the second sensor. The processor may: acquire the images according to the folding as consecutive images when a consecutive panorama photographing mode is set; display the consecutive images when the electronic device is unfolded; edit the displayed images by removing images selected from the displayed images; and process the edited images into a panoramic image by composing the edited images.

The camera may include dual cameras located on opposite ends of the housing.

Figure 6:
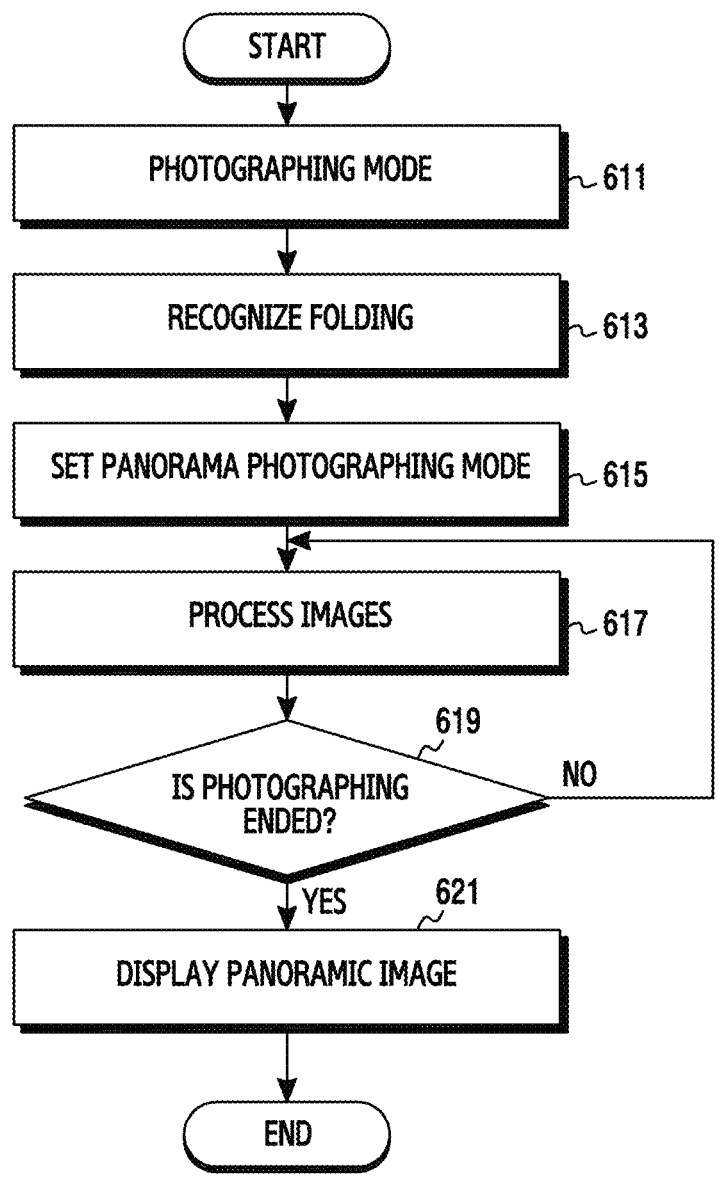
FIG. 6 illustrates a flowchart of an operation of photographing a panoramic image in an electronic device according to various embodiments of the present disclosure.

FIG. 6 illustrates a flowchart of an operation of photographing a panoramic image in an electronic device according to various embodiments of the present disclosure.

Referring to FIG. 6, when a user selects a photographing mode, the processor 100 may recognize the selection of the photographing mode in step 611. The photographing mode may be performed by a tap on a camera button displayed on the display 140 or by a selection of the photographing mode in a menu mode. When the photographing mode is selected, the processor 100 may operate the camera 120 and may process an image acquired by the camera 120 in step 611. When the user folds the electronic device in the photographing mode, the first sensor 133 may generate a sensing signal according to the folding of the hinge 210, and the processor 100 may recognize the folding of the electronic device and may analyze the folding angle by means of the output of the first sensor 133 in step 613. When recognizing the folding, the processor 100 may set a panorama photographing mode in step 615.

The user may fold the electronic device, and the photographing range of the camera 120 mounted on the back (rear) of the electronic device may vary according to the folding of the electronic device as illustrated in FIG. 2B or FIG. 3. Accordingly, images acquired by the camera 120 may be consecutive images of which the photographing ranges are varied. The processor 100 may receive the images photographed by the camera 120 as described above and may process the images in step 617. While processing the images, the processor 100 may simultaneously perform an operation of processing the photographed images into a panoramic image by composing the photographed images.

When a photographing end signal is recognized while the panorama photographing mode is being performed by the folding of the electronic device, the processor 100 may recognize the signal and may end the panorama photographing mode in step 619. The processor 100 may end the photographing operation based on the unfolding of the electronic device, an input of an end button, the range of a difference between the acquired images, the range of a movement of the electronic device, a folding speed of the electronic device, and the like. The operation of ending the panorama photographing mode may include a normal ending operation and an abnormal ending operation.

In regard to the normal ending operation, when the user unfolds the electronic device while the panorama photographing mode is being performed, the first sensor 133 may detect the unfolding of the electronic device. The processor 100 may receive an unfolding signal from the first sensor 133 and may end the panorama photographing mode in step 619. Furthermore, the user may tap on an end button while the panorama photographing mode is being performed. Then, the processor 100 may recognize the input of the end button through the input unit 150 and may end the panorama photographing mode in step 619.

In regard to the abnormal ending operation, the processor 100 may process and compose the images acquired by the camera 120 in step 617. In this case, the standard of the images that are consecutively photographed according to the movement of the electronic device may deviate from a composition range (e.g., the upper and lower positions of a horizontal panoramic image may deviate from the composition range). When the vertical deviation of the consecutive panoramic images deviates from a set range while the images are processed in step 617, the processor 100 may end the panorama photographing mode in step 619. Furthermore, the processor 100 may analyze the output of the second sensor 135 while the panorama photographing mode is being performed. If the movement of the electronic device (e.g., vertical or horizontal movement, rotation, or the like of the electronic device) that is detected by the second sensor 135 is greater than or equal to a set movement, the processor 100 may end the panorama photographing mode in step 619. Furthermore, when the electronic device is rapidly folded, the camera 120 cannot acquire normal images, and may create blurred images. When it is recognized that the folding speed detected by the first sensor 133 is higher than or equal to a set speed, the processor 100 may end the panorama photographing mode in step 619.

When recognizing the ending of the panorama photographing mode in step 619, the processor 100 may process the acquired images into a panoramic image in step 621. Furthermore, the processor 100 may store the processed panoramic image in the memory 110 and may display the panoramic image on the display 140.

Figure 7:
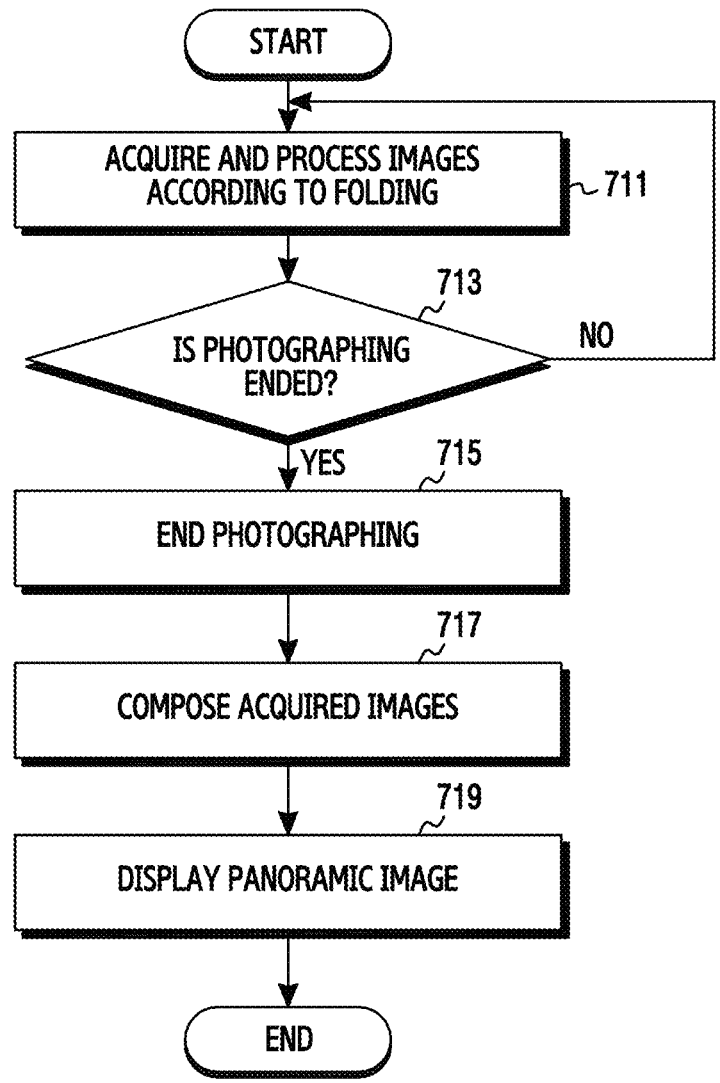
FIG. 7 illustrates a flowchart of an operation of processing a general panoramic image by a foldable electronic device in various embodiments of the present disclosure.

FIG. 7 illustrates a flowchart of an operation of processing a general panoramic image by a foldable electronic device in various embodiments of the present disclosure.

Referring to FIG. 7, the processor 100 may process images acquired by the camera 120 in step 711 when it is recognized that the electronic device is folded while a photographing mode is set. When the electronic device is folded, the photographing direction of the camera 120 may also shift toward the folding direction. Accordingly, the camera 120 may acquire consecutive images while changing the photographing range thereof toward the direction in which the electronic device is folded. Then, the processor 100 may create a panoramic image by processing and composing the consecutively acquired images in step 711. In this case, the panoramic image may be an image that has no moving subject. When a photographing end signal for ending the panoramic photographing mode is recognized, the processor 100 may end the photographing mode by turning off the camera 120 in step 715. Here, the photographing end signal may be generated by unfolding the electronic device or by an end button. Furthermore, the processor 100 may recognize the output of the sensor module 130 or an abnormal end signal in the image processing process. When recognizing the ending of the photographing, the processor 100 may create a panoramic image by composing the acquired images in step 717. The processor 100 may store the created panoramic image in the memory 110 and may display the panoramic image on the display 140 in step 719.

Figure 8:
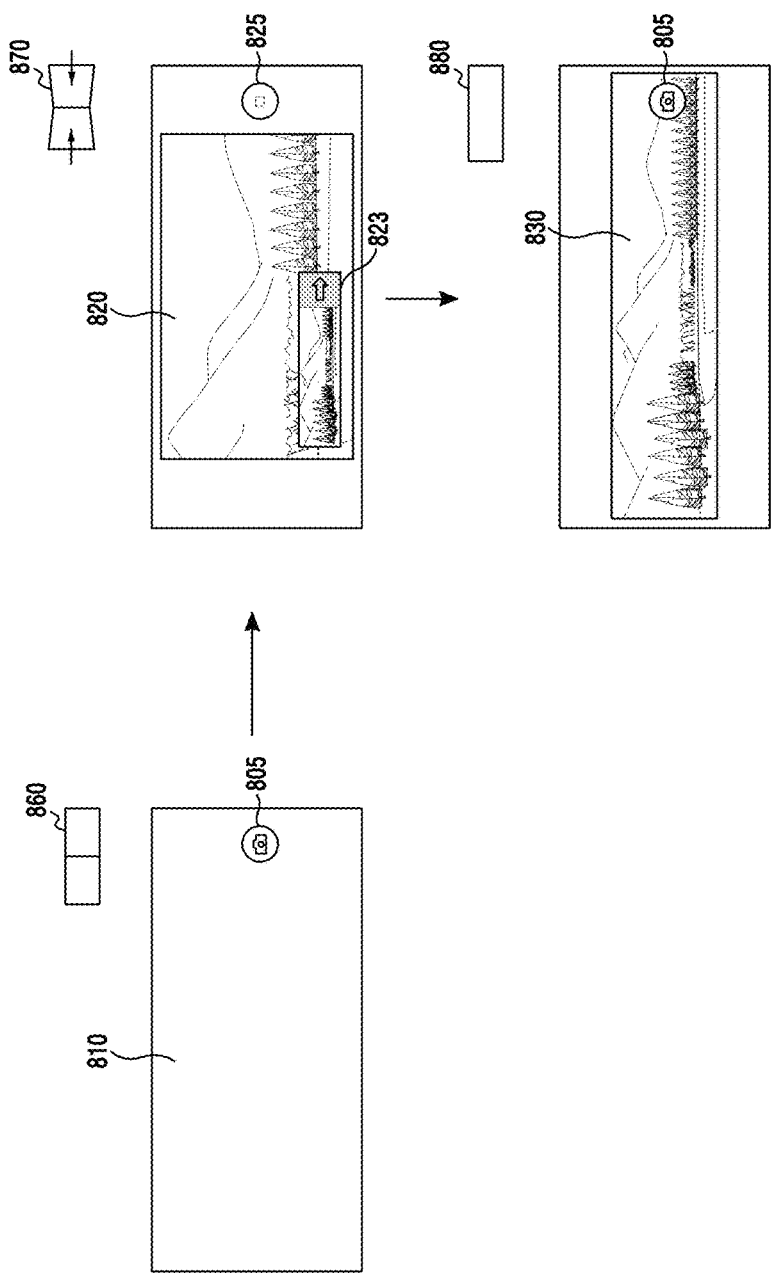
FIG. 8 illustrates an example of a general panoramic image that is processed as illustrated in FIG. 7.

FIG. 8 illustrates a view of a general panoramic image that is processed as illustrated in FIG. 7.

Referring to FIG. 8, reference numerals 860, 870, 880 indicate the states (folded and unfolded states) of the electronic device. When the electronic device is not folded as indicated by reference numeral 860 of FIG. 8 while a photographing mode is set, the processor 100 may display an image photographed by the camera 120 as shown on a screen 810. In this case, the camera 120 may photograph a still image when a user taps on a capture button 805. When the user folds the electronic device as indicated by reference numeral 870, the processor 100 may recognize the folding of the electronic device through the first sensor 133 and may process and compose images acquired according to the folding of the electronic device as in step 711. The image acquired by the camera 120 according to the folding of the electronic device may be displayed on the display 140 as shown on a screen 820, and the previously photographed and composed images may be displayed in one area of the display 140 as shown on a sub-screen 823 in the screen 820. FIG. 8 illustrates an example in which the sub-screen 823 is displayed on the lower left side of the display 140.

When the user taps on a photographing end button 825, or unfolds the electronic device as indicated by reference numeral 880, while the panorama photographing mode for displaying the acquired images as shown on the screen 820 is being performed, the processor 100 may recognize the ending of the general panorama photographing mode as in step 713. Further, when recognizing the ending of the photographing, the processor 100 may display a general panoramic image on the display 140 as shown on a screen 830 by composing the acquired images.

The panoramic image may be an image obtained by processing the multiple images into a single image by composing the multiple images. In this case, a desired panoramic image cannot be created if there are moving subjects in the images. In various embodiments of the present disclosure, the foldable electronic device may provide a panorama photographing mode (a moving panorama photographing mode) in the following methods if moving subjects are included. First, if moving subjects exist in a panorama photographing mode, the electronic device may predict intervals by which the subjects do not overlap each other, acquire images in units of the predicted intervals, and process the acquired images into a panoramic image. Second, if moving subjects exist in a panorama photographing mode, the electronic device may identify the moving distances of the subjects, acquire images in a state in which the moving subjects do not overlap each other in the previous image, and process the images into a panoramic image. Third, if moving subjects exist in a panorama photographing mode, the electronic device may acquire multiple images by performing a consecutive photographing operation, remove images selected from the acquired multiple images, and process the remaining images into a panoramic image by composing the remaining images.

Figure 9:
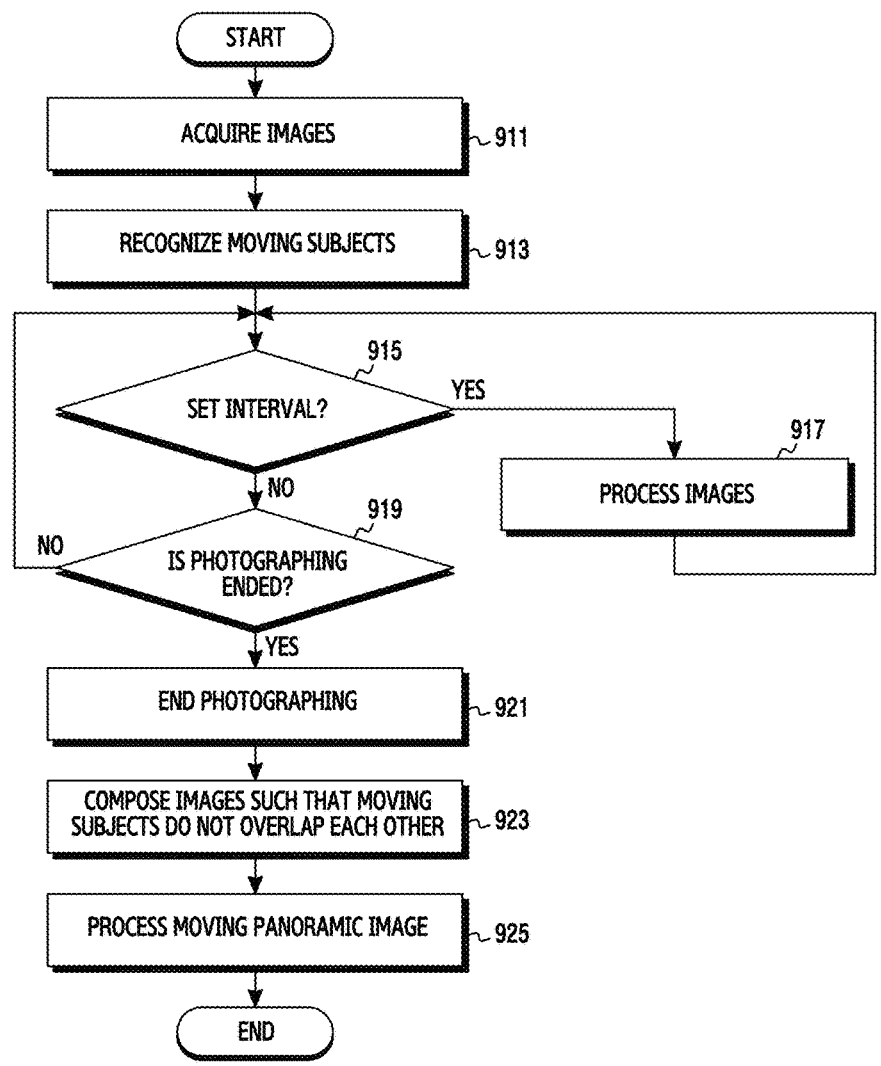
FIG. 9 illustrates a flowchart of an operation of processing a moving panoramic image in various embodiments of the present disclosure.

FIG. 9 illustrates a flowchart of an operation of processing a moving panoramic image in various embodiments of the present disclosure.

Referring to FIG. 9, when it is recognized that the electronic device is folded in a photographing mode, the processor 100 may perform a panorama photographing mode. When the panorama photographing mode is performed, the processor 100 may process images output from the camera 120 in step 911, and may identify whether moving subjects exist in the images in step 913. Here, a plurality of images may be acquired in step 911, and the processor 100 may compare the plurality of images to analyze whether moving subjects exist in the images in step 913. The operations in steps 911 and 913 may be omitted in a case where a moving panorama photographing mode is selected using a panorama photographing menu and fixed set intervals are used.

In the panorama photographing mode, the photographing range of the camera 120 may be varied according to the folding of the electronic device. In a moving panorama photographing mode, the processor 100 may process the images acquired by the camera 120 at set intervals to compose the images into a panoramic image. Here, the set intervals may set time intervals or set folding angles. In a case where the set intervals are set to be specified time intervals, the processor 100 may identify whether the specified time intervals correspond to the set time intervals in step 915. When it is identified that the specified time intervals correspond to the set time intervals, the processor 100 may recognize it and may process the images acquired by the camera 120. Namely, the processor 100 may process the images acquired by the camera 120 at the set time intervals. Furthermore, in a case where the set intervals are set to be specified folding angles, the processor 100 may recognize the folding angles of the electronic device from the output of the first sensor 133 and may process the images output from the camera 120 at the set folding angle intervals. The image processing in step 917 may include an operation of processing the images acquired by the camera 120 and an operation of composing the processed images. Namely, the set intervals may be set to be sufficient intervals such that moving subjects do not overlap each other in the panoramic image. Accordingly, if the acquired images are processed at the set intervals, the moving subjects included in the images may not overlap each other when the processed images are composed.

When a photographing end signal is recognized while the moving panorama photographing mode is being performed in steps 915 and 917, the processor 100 may recognize the ending of the photographing in step 919, and may control the camera 120 to end the photographing mode in step 921. Here, the photographing end signal may be generated by the unfolding of the electronic device or by an input of an end button. Alternatively, the photographing end signal may be generated by detecting abnormal panorama photographing as described above.

After the photographing ends, the processor 100 may create a moving panoramic image by composing the photographed images such that moving subjects do not overlap each other in step 913. The processor 100 may store the created moving panoramic image in the memory 110 and may display the created moving panoramic image on the display 140 in step 925.

Figure 10:
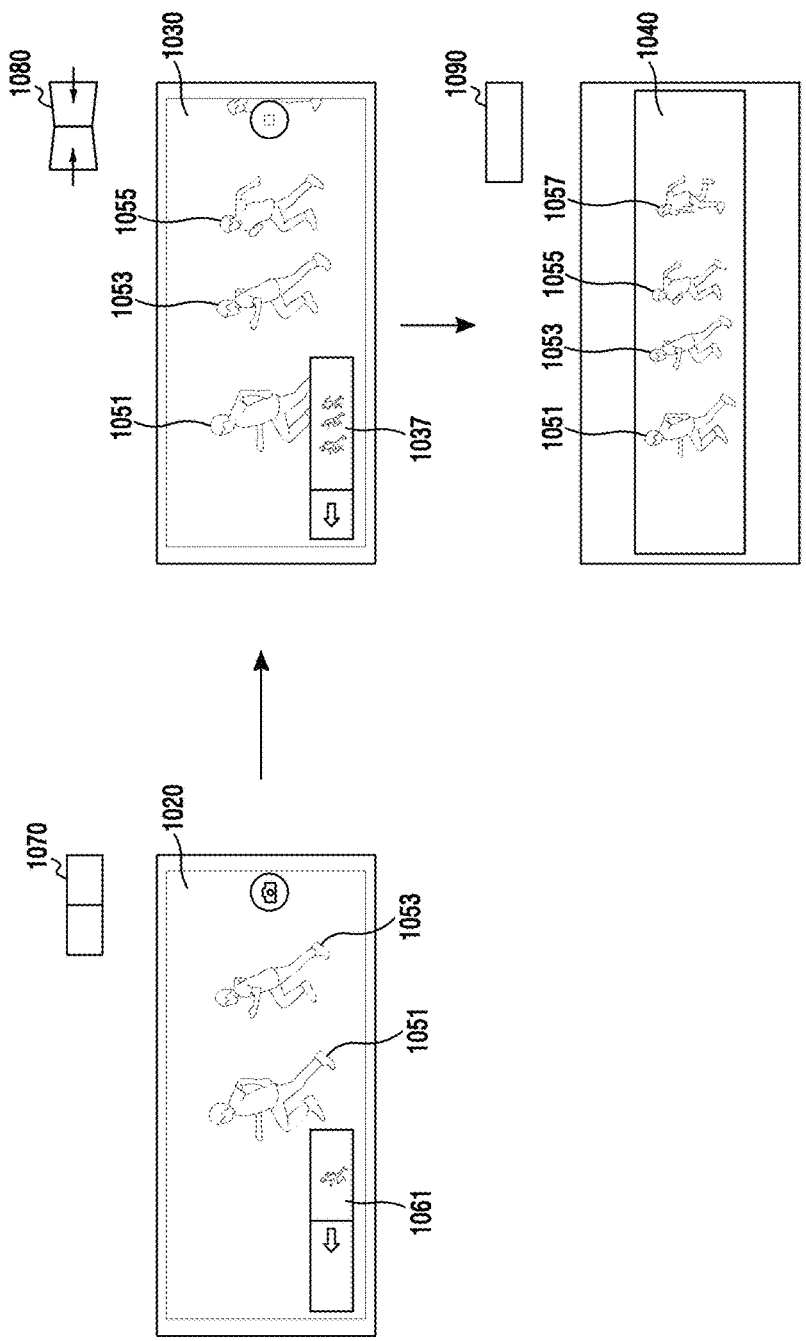
FIG. 10 illustrates a display example of images that are processed in the operations of the moving panorama photographing mode illustrated in FIG. 9.

FIG. 10 illustrates a display example of images that are processed in the operations of the moving panorama photographing mode illustrated in FIG. 9.

Referring to FIG. 10, when the electronic device is not folded while a moving panorama photographing mode is set, the processor 100 may display an image acquired by the camera 120 on the display 140. The processor 100, when recognizing that the electronic device is not folded as indicated by reference numeral 1070, may display the image acquired by the camera 120 on the display 140 as shown on a screen 1020, and may display a processed panoramic image screen 1061 on the screen 1020. The processor 100 may analyze the travel time of moving subjects 1051 and 1053 included in the images that are acquired while steps 911 and 913 are being performed, and may set intervals for processing the images according to the analysis result. The set intervals may be intervals by which the moving subjects do not overlap each other when a panoramic image is created, and may be determined to be time intervals or folding angles of the electronic device.

In the moving panorama photographing mode, a user may fold the electronic device as indicated by reference numeral 1080, and the camera 120 may acquire images with the photographing range changed according to the folding of the electronic device. The processor 100 may process the images acquired by the camera 120 at the set intervals while performing steps 915 and 917 to display an image as shown on a screen 1030, and may compose the processed images to display the composite image in one area of the screen 1030 as shown on a screen 1037. The moving subjects acquired by the camera 120 may be displayed as moving subjects on the screen 1030 as indicated by reference numeral 1055, and the moving subjects processed at the previous set interval may be displayed as still images on the screen 1030 as indicated by reference numerals 1051 and 1053.

When an input of an end button is detected, or the electronic device is detected to be unfolded as indicated by reference numeral 1090, while the moving panorama photographing mode is being performed, the processor 100 may recognize it in step 919, process the images into a moving panoramic image by processing and composing the images, and display the processed moving panoramic image on the display 140 as shown on a screen 1040.

Figure 11:
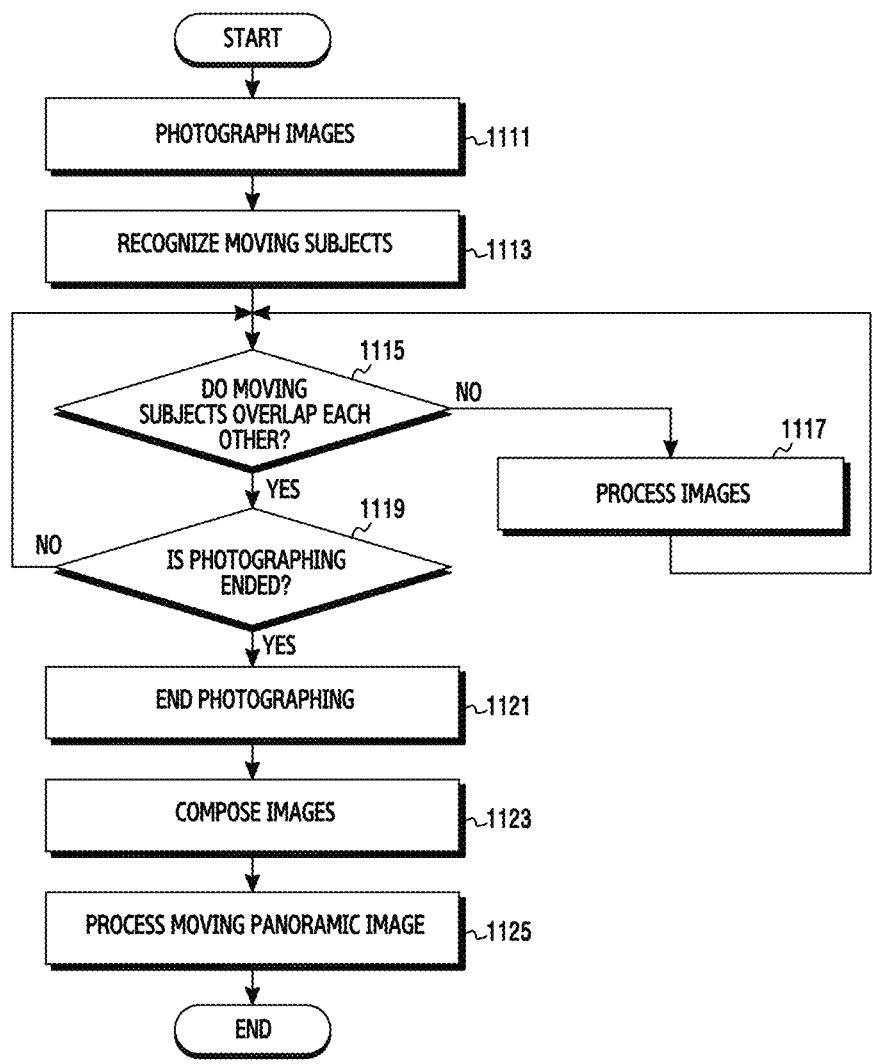
FIG. 11 illustrates a flowchart of an operation of processing a moving panoramic image in various embodiments of the present disclosure.

FIG. 11 illustrates a flowchart of an operation of processing a moving panoramic image in various embodiments of the present disclosure.

Referring to FIG. 11, when it is recognized that the electronic device is folded in a photographing mode, the processor 100 may perform a panorama photographing mode. When the panorama photographing mode is performed, the processor 100 may process images output from the camera 120 in step 1111, and may identify whether moving subjects exist in the images in step 1113. In a moving panorama photographing mode, the camera 120 may acquire images with the photographing range that is changed by folding the electronic device, and the processor 100 may analyze the images acquired by the camera 120. If moving subjects in the images do not overlap each other, the processor 100 may recognize it in step 1115, and may perform an image processing operation and compose the processed images in step 1117. In the moving panorama photographing mode, the processor 100 may process the images output from the camera 120 when the moving subjects recognized while steps 1115 and 1117 are being performed move to positions where the moving subjects do not overlap each other, and may repetitively perform the operation of recognizing moving subjects in step 1113 if the moving subjects overlap each other. Accordingly, when photographing a panoramic image that includes moving subjects, the processor 100 may repetitively perform the image processing operation in the intervals where the moving subjects do not overlap each other.

When a photographing end signal is detected while the moving panorama photographing mode is being performed, the processor 100 may recognize it in step 1119 and may turn off the camera 120 to end the photographing operation in step 1121. After the photographing ends, the processor 100 may create a moving panoramic image by composing the photographed images such that the moving subjects do not overlap each other in step 1123. The processor 100 may store the created moving panoramic image in the memory 110 and may display the created moving panoramic image on the display 140 in step 1125.

Figure 12:
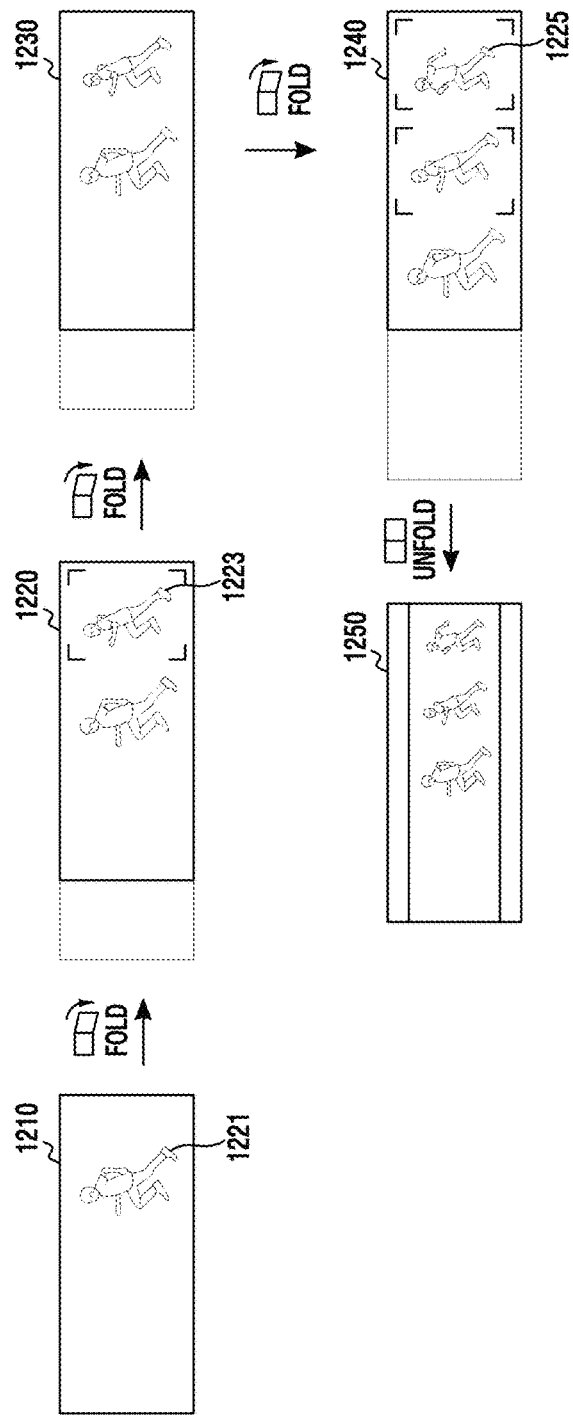
FIG. 12 illustrates a display example of images that are processed in the operations of the moving panorama photographing mode illustrated in FIG. 11.

FIG. 12 illustrates a display example of images that are processed in the operations of the moving panorama photographing mode illustrated in FIG. 11.

Referring to FIG. 12, when the electronic device is not folded while a moving panorama photographing mode is set, the processor 100 may display an image acquired by the camera 120 on the display 140 as shown on a screen 1210. In the moving panorama photographing mode, the processor 100 may recognize a moving subject (or main subject) 1215. When the processor 100 recognizes that the electronic device is folded, the processor 100 may display an image acquired by the camera 120 on the display 140 as shown on a screen 1220. Furthermore, although not displayed on the screen 1220, a processed panoramic image may be displayed on a sub-screen in the screen 1020. The processor 100 may recognize a movement of the moving subject 1215 in step 1113, and may identify whether the moving subject 1215 moves to a position where the moving subject 1215 does not overlap a moving subject 1225. When the moving subjects 1215 and 1225 do not overlap each other, the processor 100 may process the image output from the camera 120 in step 1117 and may compose the processed image with the previous images as shown on a screen 1230. Namely, the processor 100 may process the image and compose the processed image with the previous images in the position where the moving subjects do not overlap each other. Thereafter, if the moving subjects move, a moving subject 1245 may be displayed as shown on a screen 1240, and the processor 100 may process a panoramic image that includes the moving subjects while repetitively performing the above-described operation.

When an input of an end button is detected, or the electronic device is detected to be unfolded, while the moving panorama photographing mode is being performed, the processor 100 may recognize it in step 1119, process the images into a moving panoramic image by processing and composing the images, and display the processed moving panoramic image on the display 140 as shown on a screen 1040.

Figure 13:
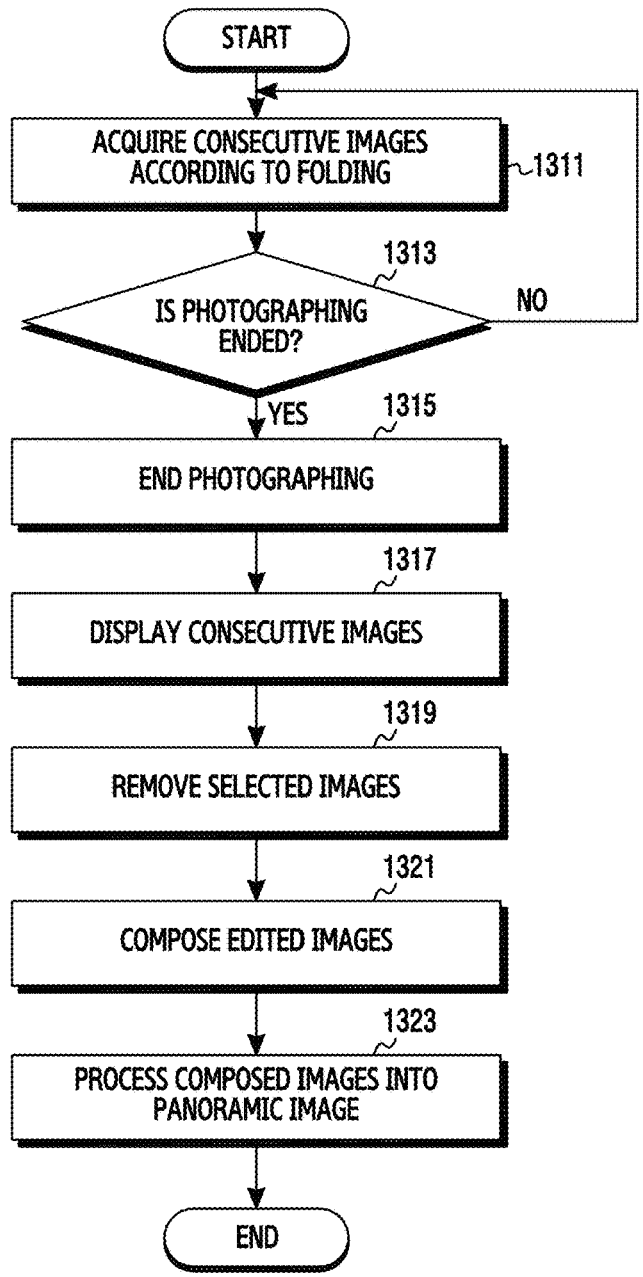
FIG. 13 illustrates a flowchart of an operation of processing a consecutive panoramic image in various embodiments of the present disclosure.

FIG. 13 illustrates a flowchart of an operation of processing a consecutive panoramic image in various embodiments of the present disclosure.

Referring to FIG. 13, when it is recognized that the electronic device is folded in a photographing mode, the processor 100 may perform a consecutive panorama photographing mode. When the consecutive panorama photographing mode is performed, the processor 100 may acquire images output from the camera 120 at set intervals and may process the images into still images in step 1311. In the consecutive panorama photographing mode, the photographing range of the camera 120 may be varied by the folding of the electronic device. In the consecutive panorama photographing mode, the processor 100 may process the images acquired by the camera 120 at the set intervals and may temporarily store the processed images as still images. The set intervals may be set time intervals or set folding angles. In a case where the set intervals are set to be specified time intervals, the processor 100 may process the images output from the camera 120 into still images at the set time intervals in step 1311. Furthermore, in a case where the set intervals are set to be specified folding angles, the processor 100 may recognize the folding angles of the electronic device from the output of the first sensor 133 and may process the images output from the camera 120 into still images at the set folding angle intervals.

When a photographing end signal is recognized while the consecutive panorama photographing mode is being performed, the processor 100 may recognize the ending of the photographing in step 1313, and may control the camera 120 to end the consecutive panorama photographing mode in step 1315. Here, the photographing end signal may be generated by unfolding the electronic device or by an input of an end button. Alternatively, the photographing end signal may be generated by detecting abnormal panorama photographing as described above.

After the photographing ends, the processor 100 may display the consecutive images, which are stored in the memory 110, on the display 140 in step 1317. In this case, a user may select undesired images from the displayed consecutive images. The processor 100 may recognize the images selected by the user through the input unit 150 and may remove the recognized images in step 1319. When the user's selection is completed, the processor 100 may create a panoramic image by composing the remaining images in step 1321. The processor 100 may store the created panoramic image in the memory 110 and may display the panoramic image on the display 140 in step 1323.

As described above, the panoramic image may be created by consecutively photographing images acquired by the folding of the electronic device while performing the consecutive panorama photographing mode, processing the consecutive images into still images, displaying the consecutive images after the photographing ends, removing images that the user does not want, composing the edited images, and processing the composite image into a panoramic image. In a case where the panoramic image is a moving panoramic image, the user may remove images in which moving subjects overlap each other.

Figure 14:
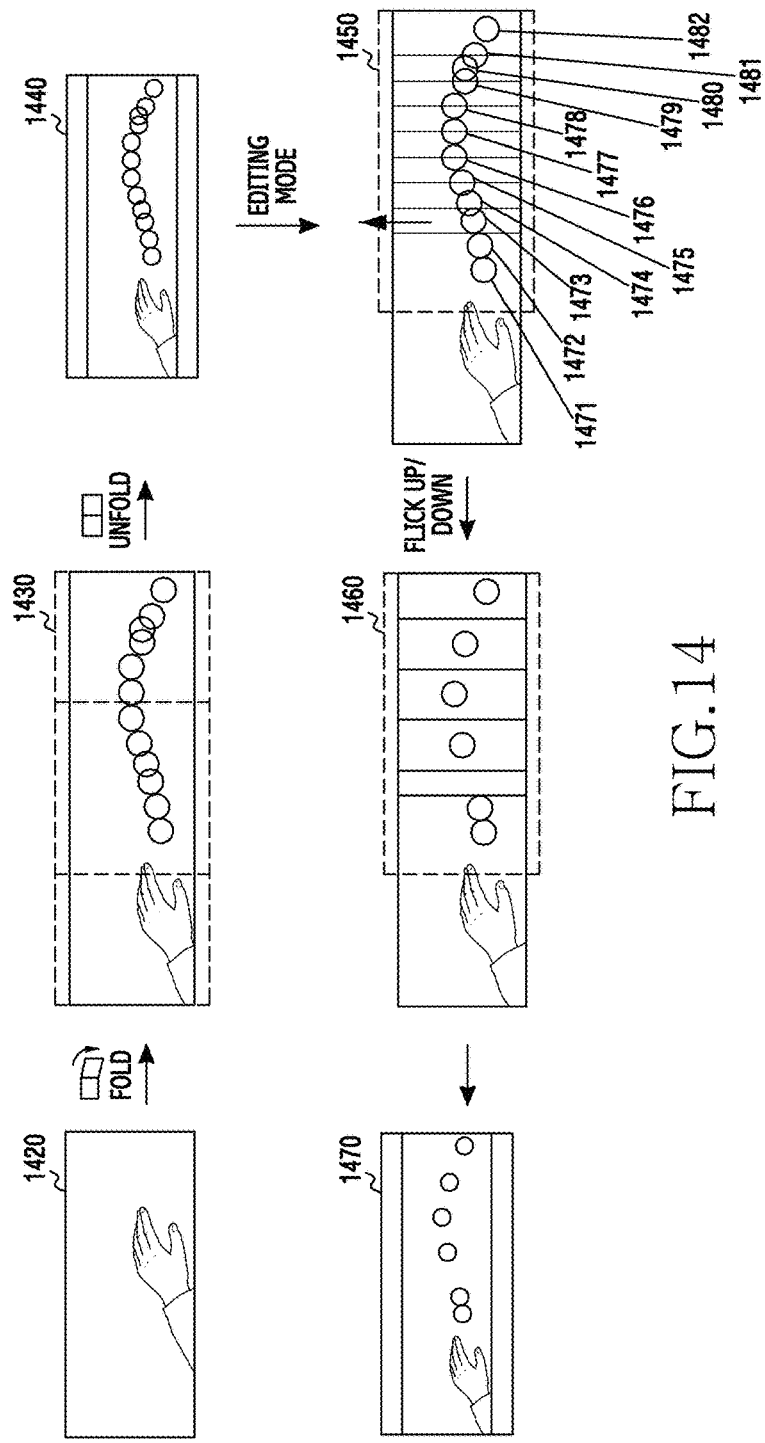
FIG. 14 illustrates an example of processing images photographed in a consecutive panorama photographing mode as illustrated in FIG. 13.

FIG. 14 illustrates an example of processing images photographed in a consecutive panorama photographing mode as illustrated in FIG. 13.

Referring to FIG. 14, when a photographing mode is selected and the electronic device is folded while a screen 1420 is being displayed, the processor 100 may process images acquired by the camera 120 while performing a consecutive panorama photographing mode as in step 1311. The camera 120 may acquire the images while changing the photographing range in response to the folding of the electronic device. Further, the processor 100 may process the images acquired by the camera 120 into still images at set time intervals. Alternatively, the processor 100 may recognize a representative subject in the consecutive panorama photographing mode and may process the images acquired by the camera 120 into still images while tracking the movement of the recognized representative subject.

The photographing range of the camera 120 may be varied in response to the folding of the electronic device. The processor 100 may acquire images according to the folding of the camera 120 and may process the images into still images as in step 1311. Namely, among the images acquired by the camera 120, images acquired in units of set time intervals may be processed into still images by the processor 100. The images acquired by the camera 120 may be images similar to those shown on a screen 1430, and the images stored in the memory 110 may be still images similar to those shown on a screen 1450. When a signal for ending the consecutive panorama photographing mode is recognized, the processor 100 may end the consecutive panorama photographing mode, and the photographed image may be similar to that shown on a screen 1440. Here, the signal for ending the consecutive panorama photographing mode may be generated by unfolding the electronic device, and the processor 100 may recognize the unfolding of the electronic device from the output of the first sensor 133 as in step 1313.

When the photographing ends, the processor 100 may turn the camera 120 off as in step 1315. Thereafter, the processor 100 may display the consecutive images on the display 140 as shown on the screen 1450 in step 1317. A method of displaying the consecutive images may be automatically displayed when the photographing ends, or may be manually displayed by a user's particular input. Here, the user's particular input may be, for example, a folding and unfolding operation. The processor 100 may automatically or manually display a plurality of processed still images when the consecutive panorama photographing mode ends. The displayed images may have the form of a still image, and the still images 1471, 1472, 1473, 1474, 1475, 1476, 1477, 1478, 1479, 1480, 1481, and 1482 may be differently displayed as shown on the screen 1450. When a user selects the still images as indicated by reference numeral 1455 (e.g., when the user flicks particular still images), the processor 100 may remove the selected still images as in step 1319. The removed images, when being coupled with the other still images, may make the main subjects (e.g., moving subjects) overlap each other. The processor 100 may remove the selected images and may then display the edited images as shown on a screen 1460. The edited images herein may be still images that are left after the selected still images are removed. Thereafter, when the user performs an editing end operation, the processor 100 may compose the edited still images as shown on the screen 1460 in step 1321, and may then display the composite image as a panoramic image as shown on a screen 1470 in step 1323. The screen 1460 may be a screen in which particular images, for example, the images 1473, 1474, 1476, 1478, 1480, and 1481 are removed from the screen 1450. Here, the editing end operation may be, for example, an operation of folding and unfolding the electronic device.

Figure 15:
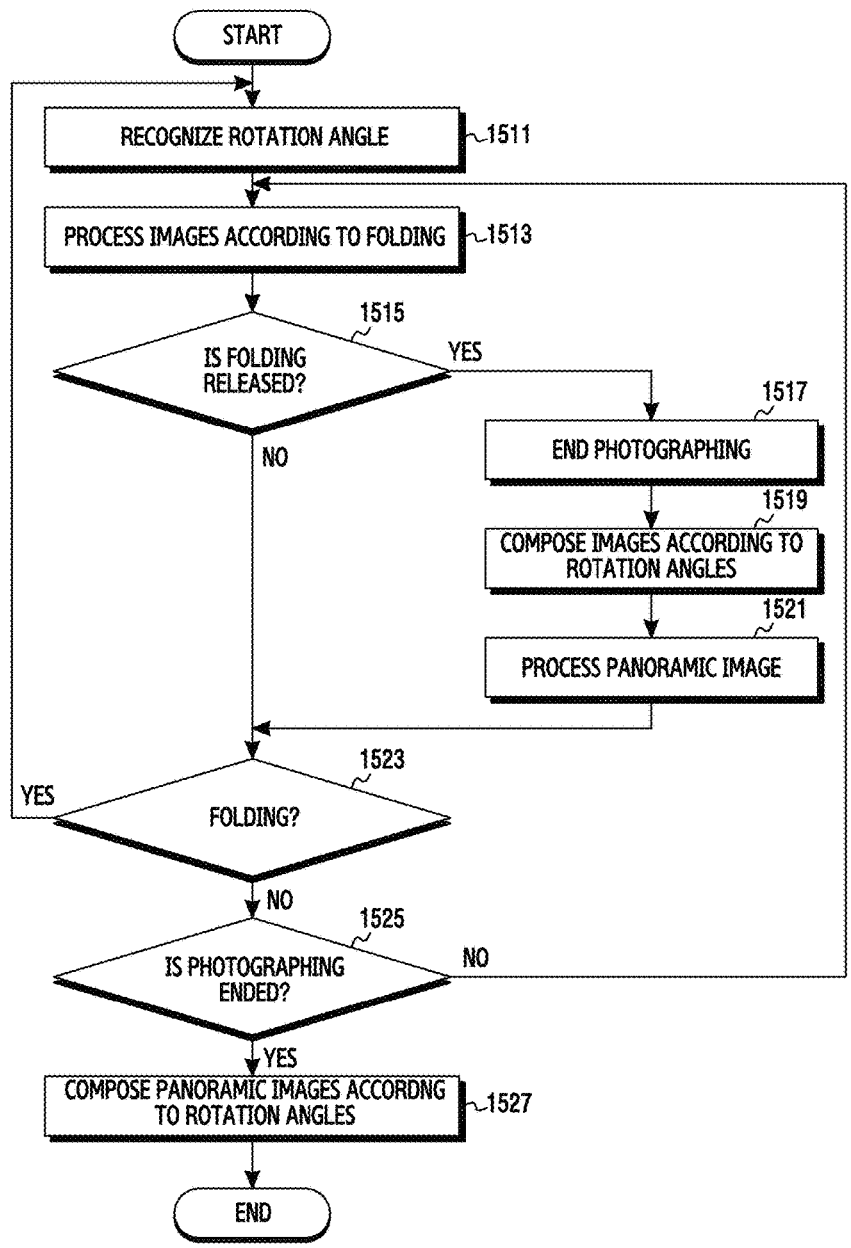
FIG. 15 illustrates a flowchart of an operation of processing a complex panoramic image in various embodiments of the present disclosure.
Figure 16:
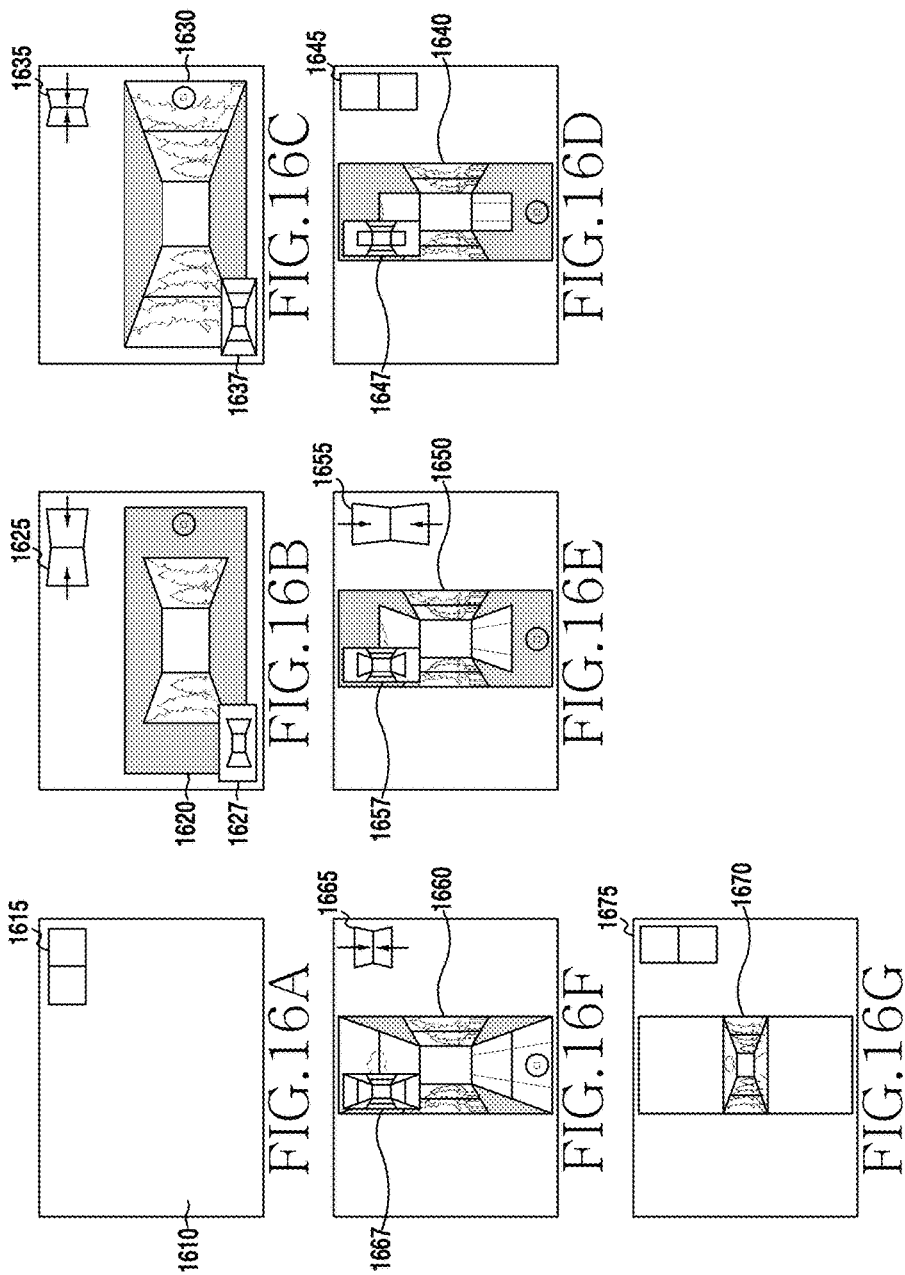
FIGS. 16A to 16G illustrate an example of processing images photographed in a complex panorama photographing mode as illustrated in FIG. 15.

FIG. 15 illustrates a flowchart of an operation of processing a complex panoramic image in various embodiments of the present disclosure.

Referring to FIG. 15, when a photographing mode is set, and a panorama photographing mode is set according to the folding of the electronic device, the processor 100 may analyze the output of the second sensor 135 to measure the direction and/or the rotation angle of the electronic device in step 1511. Thereafter, the processor 100 may process output images of the camera 120 acquired according to the folding of the electronic device and may compose the processed images according to the rotation angle in step 1513. When a signal for ending the photographing (e.g., a signal for unfolding the electronic device) is detected, the processor 100 may recognize the signal in step 1515 and may turn the camera 120 off to end the photographing in step 1519. The panorama photographing mode may be a first panorama photographing mode. Thereafter, the processor 100 may process the acquired images and may compose the images according to the rotation angle in step 1519. The processor 100 may store the composite image as a panoramic image in the memory 110 and may display the panoramic image on the display 140 in step 1521.

When a user changes the direction of the electronic device and folds the electronic device while the first panoramic image has been photographed, the processor 100 may recognize it in step 1523. For example, the user may consecutively perform a second panorama photographing mode in another direction (e.g., the vertical direction) by rotating the electronic device after performing the first panorama photographing mode in the first direction (e.g., the horizontal direction). When the electronic device is rotated after the panorama photographing mode is performed, the processor 100 may detect the rotation direction and angle of the electronic device through the second sensor 135, and when the electronic device is folded, the processor 100 may detect the folding of the electronic device through the first sensor 133 in step 1523.

When recognizing the folding of the electronic device in step 1523, the processor 100 may return to step 1511 to repeat the operation of recognizing the current rotation direction and angle of the device, processing images acquired by the camera 120 according to the folding of the electronic device, and composing the images according to the rotation angle. Thereafter, when the folding is released, the processor 100 may compose the images according to the recognized rotation angle while repetitively performing steps 1517 to 1521 and may process the composite image into a second panoramic image. Accordingly, the processor 100 may create the panoramic images by processing and composing the images according to the folding of the electronic device in accordance with the rotation directions and angles.

When a signal for ending the panorama photographing is generated, the processor 100 may recognize it in step 1525 and may compose the processed panoramic images according to the respective rotation directions and angles in step 1527. In this case, particular areas of the multiple panoramic images may overlap other panoramic images. When composing the multiple panoramic images, the processor 100 may compose the panoramic images at the respective rotation angles with respect to the overlapping image areas. Furthermore, the processor 100 may store the composite complex panoramic image in the memory 110 and may display the complex panoramic image on the display 140. The processor 100 may store the multiple panoramic images, which are photographed at different angles in different directions, together with the rotation angle information, or may remove the multiple panoramic images after creating the complex panoramic image.

FIGS. 16A to 16G illustrate an example of processing images photographed in a complex panorama photographing mode as illustrated in FIG. 15.

Referring to FIGS. 16A to 16G, when a photographing mode is selected while the electronic device is unfolded as indicated by reference numeral 1615, the processor 100 may display a screen 1610. Thereafter, when a user folds the electronic device as indicated by reference numeral 1625, the processor 100 may recognize the rotation direction and the rotation angle of the electronic device from the output of the second sensor 135 and may process and compose images acquired by the camera 120 according to the folding. The composite image may be displayed in a particular area of a screen 1620 as indicated by reference numeral 1627. When the electronic device is additionally folded as indicated by reference numeral 1635, the processor 100 may display an image acquired by the camera 120 as shown on a screen 1630, and the image into which a processed image is composed may be displayed as shown on a screen 1637.

When the electronic device is unfolded and rotated as indicated by reference numeral 1645, the processor 100 may recognize the unfolding of the electronic device through the first sensor 133 as in step 1523 and may recognize the rotation direction and angle of the electronic device through the second sensor 135 as in step 1511. The processor 100 may display a screen 1640 on the display 140. The composite image may be displayed in a particular area of a screen 1640 as indicated by reference numeral 1647. When the electronic device is folded by a changed angle in the changed direction as indicated by reference numeral 1655, the processor 100 may process the images according to the folding and may compose the images according to the recognized rotation direction. For example, when the electronic device oriented in the horizontal direction as indicated by reference numeral 1620 or 1630 is folded as indicated by reference numeral 1625 or 1635, the processor 100 may process the images acquired by the camera 120 to compose the images in the horizontal direction (e.g., a rotation angle of 0 degrees). However, when the electronic device oriented in the vertical direction as indicated by reference numeral 1650 or 1660 is folded as indicated by reference numeral 1655 or 1665, the processor 100 may process the images acquired by the camera 120 to compose the images in the vertical direction (e.g., a rotation angle of 90 degrees). The composite image may be displayed in a display area assigned to a particular area of the screen 1650 or 1660 as indicated by reference numeral 1657 or 1667.

Thereafter, when the electronic device is unfolded as indicated by reference numeral 1675, the processor 100 may recognize the ending of the panorama photographing and may process the panoramic images while performing steps 1517 to 1521. The processed panoramic images may be a plurality of panoramic images that are processed at different angles in different directions. When the user determines to finish photographing a complex panoramic image, the processor 100 may process the panoramic images created at different angles in different directions into a complex panoramic image by composing the panoramic images. The processor 100 may determine overlapping image areas by comparing and analyzing the panoramic images and may create a complex panoramic image such that the panoramic images cross each other at corresponding angles in the overlapping image areas.

Figure 17:
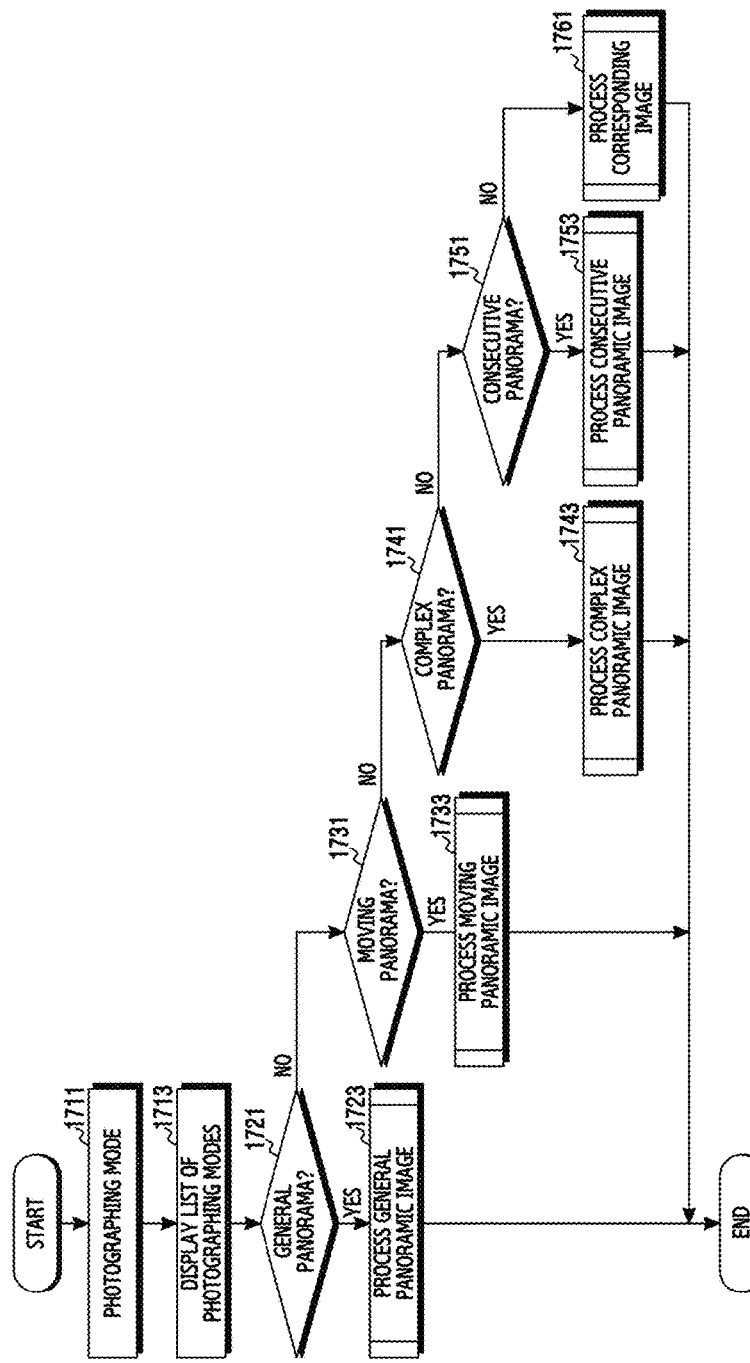
FIG. 17 illustrates a flowchart of a procedure of processing a panoramic image by an electronic device in various embodiments of the present disclosure.
Figure 18A:
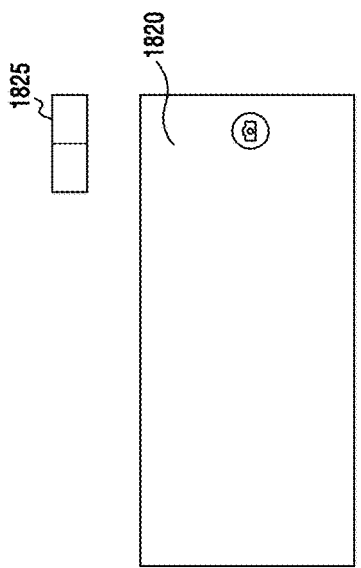
FIGS. 18A to 18D illustrate an example of processing a panoramic image in a general panorama photographing mode as illustrated in FIG. 17.
Figure 18B:
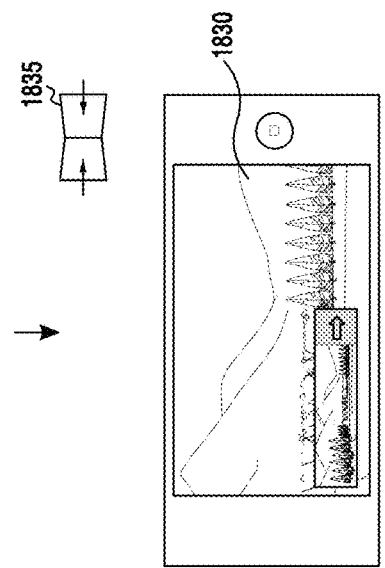
Figure 18D:
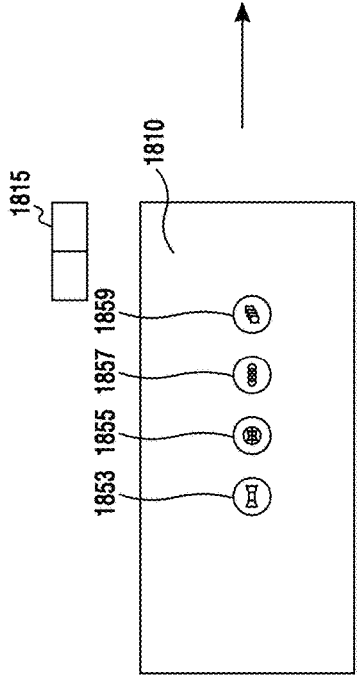
Figure 18C:
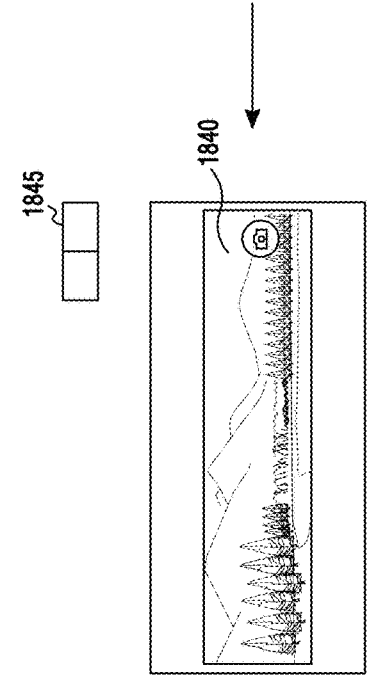

FIG. 17 illustrates a flowchart of a procedure of processing a panoramic image by an electronic device in various embodiments of the present disclosure.

Referring to FIG. 17, when a panorama photographing mode is selected, the processor 100 may recognize the selection in step 1711, and may display a list of panorama photographing modes on the display 140 in step 1713. The list of panorama photographing modes may include a general panorama photographing mode, a moving panorama photographing mode, a complex panorama photographing mode, a consecutive panorama photographing mode, and the like.

When the general panorama photographing mode is selected, the processor 100 may recognize the selection in step 1721, and may photograph and process a general panoramic image in step 1723 through operations similar to those illustrated in FIG. 7. When the moving panorama photographing mode is selected, the processor 100 may recognize the selection in step 1731, and may photograph and process a moving panoramic image in step 1733 through operations similar to those illustrated in FIG. 7 or 9. When the complex panorama photographing mode is selected, the processor 100 may recognize the selection in step 1741, and may photograph and process a complex panoramic image in step 1743 through operations similar to those illustrated in FIG. 15. When the consecutive panorama photographing mode is selected, the processor 100 may recognize the selection in step 1751, and may photograph and process a consecutive panoramic image in step 1753 through operations similar to those illustrated in FIG. 13. If the consecutive panorama photographing mode is not selected, the processor 100 may process the corresponding image in step 1761.

FIGS. 18A to 18D illustrate an example of processing a panoramic image in a general panorama photographing mode as illustrated in FIG. 17.

Referring to FIGS. 18A to 18D, when a panorama photographing mode is selected, the processor 100 may display a list of icons 1853 to 1859 for panorama photographing modes on the display 140 as shown on a screen 1810. The processor 100 may perform a panorama photographing mode that corresponds to an icon selected from the displayed icons. For example, when a general panorama icon 1853 is selected, the processor 100 may detect the selection as in step 1721 and may display the initial screen of the general panorama photographing mode as shown on a screen 1820. When a user folds the electronic device as indicated by reference numeral 1835 in this state, the processor 100 may process images photographed by the camera 120 as in step 1723 to compose the images into a panoramic image. Here, the general panorama photographing mode may be a photographing mode in a case where there is no moving subject in an image. When the electronic device is unfolded as indicated by reference numeral 1845, the processor 100 may recognize the unfolding of the electronic device through the first sensor 133 and may display a panoramic image on the display 140 as shown on a screen 1840.

When the panorama photographing mode is selected as described above, the processor 100 display the icons 1854 to 1859 for available photographing modes on the display 140 as shown on the screen 1801, and when one of the displayed icons is selected, the processor 100 may perform the panorama photographing mode corresponding to the selected icon.

Figure 19:
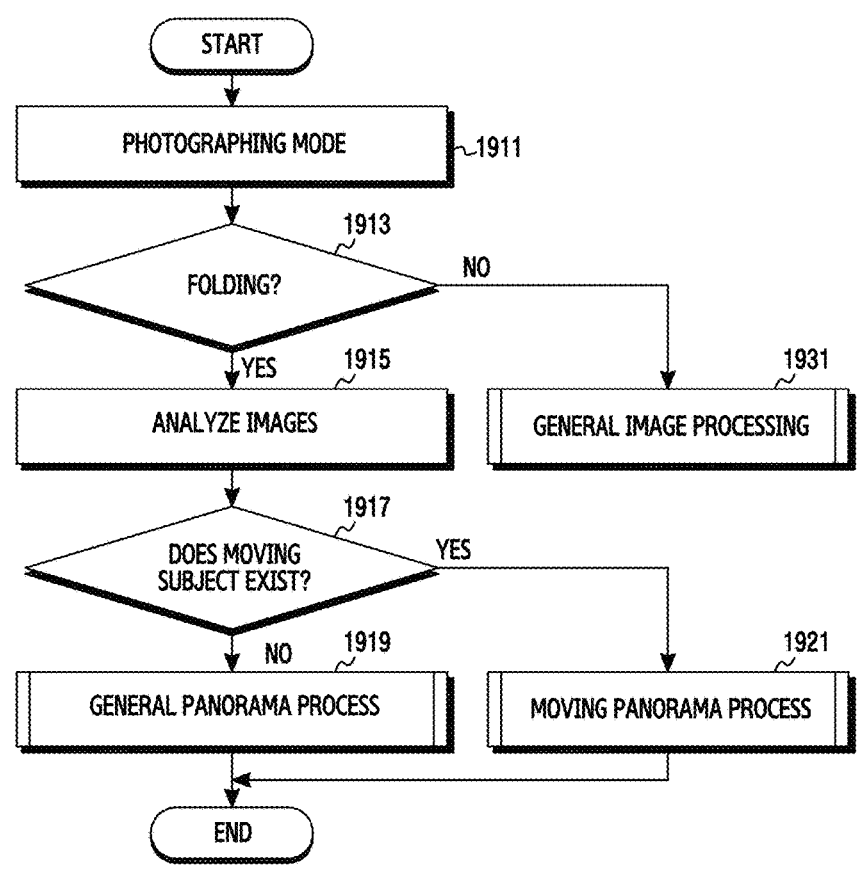
FIG. 19 illustrates a flowchart of a procedure of processing a panoramic image in an electronic device, according another embodiment of the present disclosure.

FIG. 19 illustrates a flowchart of a procedure of processing a panoramic image in an electronic device, according to another embodiment of the present disclosure.

Referring to FIG. 19, the electronic device is a foldable device, where FIG. 19 illustrates an example of determining a panorama photographing mode according to the type of subject included in an image when performing a panorama photographing mode. When a photographing mode is selected, the processor 100 may recognize the photographing mode in step 1911, and when the electronic device is folded, the processor 100 may recognize the folding of the electronic device through the first sensor 133 in step 1913. When the folding of the electronic device is not recognized, the processor 100 may perform a general image processing process in step 1913. When the folding of the electronic device is recognized, the processor 100 may analyze whether moving subjects exist in the images acquired by the camera 120 in step 1915. If moving subjects exist in the acquired images, the processor 100 may recognize it in step 1917, and may perform a moving panorama photographing mode in step 1921 as illustrated in FIG. 9 or 11. In contrast, if moving subjects do not exist in the acquired images, the processor 100 may perform a general panorama photographing mode in step 1919 as illustrated in FIG. 7.

A method of processing an image in an electronic device, according to various embodiments of the present disclosure, may include: setting a photographing mode; recognizing the folding of a housing in the photographing mode; acquiring images from a camera, the photographing position of which varies according to the folding; and processing the acquired images into a panoramic image by composing the acquired images.

The processing of the acquired images into the panoramic image may include: ending the acquiring of the images when the unfolding of the housing is detected; and creating a general panoramic image by composing the acquired images.

The acquiring of the images may include acquiring images at set intervals, and the processing of the acquired images into the panoramic image may include creating a moving panoramic image by composing the images such that moving subjects do not overlap each other. The set intervals may be set folding angles or set time intervals.

The acquiring of the images may include acquiring the images according to the folding as consecutive images, and the processing of the acquired images into the panoramic image may include: displaying the acquired consecutive images; editing the displayed images by removing images selected from the displayed images; and processing the edited consecutive images into a panoramic image by composing the edited consecutive images.

The acquiring of the images may include: ending the processing of a first panoramic image when unfolding is recognized; recognizing a rotation angle when rotation is recognized; acquiring images corresponding to the recognized rotation angle; processing the acquired images into a second panoramic image by composing the acquired images; and processing the first and second panoramic images into a third panoramic image by composing the first and second panoramic images in response to the recognized rotation angle when the folding is recognized.

The acquiring of the images may include acquiring the images according to the folding as consecutive images, and the processing of the acquired images into the panoramic image may include: displaying the consecutive images; editing the displayed images by removing images selected from the displayed images; and processing the edited consecutive images into a panoramic image by composing the edited consecutive images.

A method of processing an image in an electronic device, according to various embodiments of the present disclosure, may include: setting a panorama photographing mode selected from a displayed menu; recognizing the folding of a housing in the set photographing mode; and processing images acquired from an image sensor, the photographing position of which varies according to the folding, into a panoramic image by composing the images.

As described above, the electronic device, according to the various embodiments of the present disclosure, may have a folding structure and may photograph a panoramic image by folding the electronic device. Furthermore, the electronic device may create a panoramic image by processing images acquired by the camera 120 in real time during the folding operation. Moreover, if moving subjects exist in images in a panorama photographing mode, the electronic device may create a panoramic image such that the moving subjects do not overlap each other. In addition, the electronic device may photograph panoramic images in various directions and may compose the panoramic images.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of processing an image in an electronic device, comprising:
   detecting a folding of a housing of the electronic device in a first direction;
   obtaining a first plurality of images using a camera of the electronic device while folding the housing in the first direction;
   generating a first panoramic image by composing the obtained first plurality of images;
   after generating the first panoramic image, identifying that the housing is restored as a unfolded state;
   based on the identification, detecting whether an orientation axis of the camera is changed in the unfolded state of the housing;
   based on detecting that the orientation axis is changed in the unfolded state, obtaining a second plurality of images from the camera, while folding the housing in a second direction;
   generating a second panoramic image by composing the obtained second plurality of images; and
   generating a third panoramic image by composing the first panoramic image and second panoramic image.

2. The method of claim 1, wherein obtaining the first plurality of images comprises:
   ceasing to obtain the first plurality of images when if the housing is in the unfolded state.

3. The method of claim 1, wherein obtaining the first plurality of images comprises obtaining the first plurality of images at designated intervals, and
   wherein generating the first panoramic image comprises generating the first panoramic images as a moving panoramic image by composing the first plurality of images such that moving subjects do not overlap each other.

4. The method of claim 3, wherein the designated intervals comprise designated time intervals or designated folding angles.

5. A method of processing an image in an electronic device, comprising:
   detecting a folding of a housing of the electronic device;
   obtaining a plurality of images using a camera of the electronic device while folding the housing, wherein a first image among the plurality of images includes a visual object corresponding to a moving subject, wherein a second image among the plurality of images includes a visual object corresponding to a moving subject, further wherein the visual object included in the first image and the visual object included in the second image are overlapped when composing the first image and second image;
   after obtaining the plurality of images, removing the visual object from the second image; and
   generating a panoramic image by composing the plurality of images that include the second image from which the visual object is removed.

6. The method of claim 5, wherein obtaining a plurality of images comprises obtaining images at designated time intervals or folding angles.

7. An electronic device comprising:
a housing including a connecting part, a first housing, and a second housing, the connecting part configured to rotatably connect a side of the first housing and a side of the second housing;
a flexible display disposed on a surface of the first housing and a surface of the second housing across the connecting part;
at least one camera located in the housing and configured to obtain images in response to a folding of the housing;
a first sensor configured to detect the folding by the connecting part;
a second sensor configured to detect an orientation axis change of the at least one camera; and
a processor operatively coupled to the flexible display, the at least one camera, the first sensor, and the second sensor, wherein the processor is configured to:
  detect a folding of the housing in a first direction using the first sensor,
  obtain a first plurality of images using the at least one camera while folding the housing of the electronic device,
  generate a first panoramic image by composing the obtained first plurality of images,
  after generating the first panoramic image, identify that the housing is restored as an unfolded state using the first sensor,
  based on the identification, detect whether an orientation axis of the camera is changed in the unfolded state using the second sensor,
  based on detecting that the orientation axis is changed in the unfolded state, obtain a second plurality of images from the camera, while folding the housing in a second direction,
  generate a second panoramic image by composing the obtained second plurality of images, and
  generate a third panoramic image by composing the first panoramic image and second panoramic image.

8. The electronic device of claim 7, wherein the processor is configured to cease obtaining the first plurality of images if the housing is in the unfolded state.

9. The electronic device of claim 7, wherein the processor is configured to:
  obtain the first plurality of images at designated intervals; and
  generate the first panoramic image as a moving panoramic image by composing the first plurality of images such that moving subjects do not overlap each other.

10. The electronic device of claim 9, wherein the designated intervals comprise designated time intervals or designated folding angles.

* * * * *